US012369141B2

(12) United States Patent
Elshafie et al.

(10) Patent No.: US 12,369,141 B2
(45) Date of Patent: Jul. 22, 2025

(54) SIDELINK FEEDBACK CHANNEL RESOURCES HAVING A PLURALITY OF SYMBOLS

(71) Applicant: QUALCOMM Incorporated, San Diego, CA (US)

(72) Inventors: Ahmed Elshafie, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 17/813,861

(22) Filed: Jul. 20, 2022

(65) Prior Publication Data

US 2024/0031990 A1    Jan. 25, 2024

(51) Int. Cl.
*H04W 72/02* (2009.01)
*H04L 1/08* (2006.01)
*H04L 1/1812* (2023.01)
*H04W 72/0446* (2023.01)
*H04W 72/20* (2023.01)
*H04W 72/542* (2023.01)

(52) U.S. Cl.
CPC .............. *H04W 72/02* (2013.01); *H04L 1/08* (2013.01); *H04L 1/1812* (2013.01); *H04W 72/0446* (2013.01); *H04W 72/20* (2023.01); *H04W 72/542* (2023.01)

(58) Field of Classification Search
CPC . H04W 72/02; H04W 72/0446; H04W 72/20; H04W 72/542; H04L 1/08; H04L 1/1812; H04L 1/1671; H04L 1/1858
See application file for complete search history.

(56) References Cited

U.S. PATENT DOCUMENTS

| 12,010,687 | B2* | 6/2024 | Elshafie | H04W 72/25 |
| 2021/0112544 | A1 | 4/2021 | Chen | |
| 2021/0168790 | A1* | 6/2021 | Li | H04L 1/1861 |
| 2021/0250954 | A1* | 8/2021 | Li | H04L 1/1854 |
| 2022/0070829 | A1* | 3/2022 | Kusashima | H04W 72/04 |
| 2022/0201654 | A1* | 6/2022 | Lee | H04W 72/20 |

(Continued)

FOREIGN PATENT DOCUMENTS

WO    2021262900 A1    12/2021

OTHER PUBLICATIONS

International Search Report and Written Opinion—PCT/US2023/024008—ISA/EPO—Aug. 16, 2023.

*Primary Examiner* — Abdullahi Ahmed

(74) *Attorney, Agent, or Firm* — Harrity & Harrity, LLP

(57) ABSTRACT

Various aspects of the present disclosure generally relate to wireless communication. In some aspects, a first user equipment (UE) may receive, from a second UE or a network node, a configuration for a resource pool, wherein the resource pool is associated with a physical sidelink feedback channel (PSFCH) resource comprising more than two symbols. The first UE may receive, from the second UE, a sidelink transmission. The first UE may transmit, to the second UE and based at least in part on the sidelink transmission, a hybrid automatic repeat request (HARQ) acknowledgement (ACK) feedback based at least in part on the PSFCH resource comprising more than two symbols. Numerous other aspects are described.

30 Claims, 15 Drawing Sheets

(56) References Cited

U.S. PATENT DOCUMENTS

| | | | |
|---|---|---|---|
| 2022/0393807 A1* | 12/2022 | Xue | H04L 1/1812 |
| 2023/0224096 A1* | 7/2023 | Gubeskys | H04L 1/1861 |
| | | | 370/329 |
| 2024/0314811 A1* | 9/2024 | Yang | H04W 72/25 |

* cited by examiner

SIDELINK FEEDBACK CHANNEL RESOURCES HAVING A PLURALITY OF SYMBOLS

FIELD OF THE DISCLOSURE

Aspects of the present disclosure generally relate to wireless communication and to techniques and apparatuses for sidelink feedback channel resources having a plurality of symbols.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first user equipment (UE) includes a memory and one or more processors, coupled to the memory, the memory storing code executable by the one or more processors to cause the first UE to: receive, from a second UE or a network node, a configuration for a resource pool, wherein the resource pool is associated with a physical sidelink feedback channel (PSFCH) resource comprising more than two symbols; receive, from the second UE, a sidelink transmission; and transmit, to the second UE and based at least in part on the sidelink transmission, a hybrid automatic repeat request (HARQ) acknowledgement (ACK) feedback based at least in part on the PSFCH resource comprising more than two symbols.

In some implementations, an apparatus for wireless communication at a second UE includes a memory and one or more processors, coupled to the memory, the memory storing code executable by the one or more processors to cause the second UE to: transmit, to a first UE, a configuration for a resource pool, wherein the resource pool is associated with a PSFCH resource comprising more than two symbols; transmit, to the first UE, a sidelink transmission; and receive, from the first UE and based at least in part on the sidelink transmission, a HARQ-ACK feedback based at least in part on the PSFCH resource comprising more than two symbols.

In some implementations, a method of wireless communication performed by a first UE includes receiving, from a second UE or a network node, a configuration for a resource pool, wherein the resource pool is associated with a PSFCH resource comprising more than two symbols; receiving, from the second UE, a sidelink transmission; and transmitting, to the second UE and based at least in part on the sidelink transmission, a HARQ-ACK feedback based at least in part on the PSFCH resource comprising more than two symbols.

In some implementations, a method of wireless communication performed by a second UE includes transmitting, to a first UE, a configuration for a resource pool, wherein the resource pool is associated with a PSFCH resource comprising more than two symbols; transmitting, to the first UE, a sidelink transmission; and receiving, from the first UE and based at least in part on the sidelink transmission, a HARQ-ACK feedback based at least in part on the PSFCH resource comprising more than two symbols.

In some implementations, a non-transitory computer-readable medium storing one or more instructions for wireless communication, the one or more instructions, when executed by one or more processors of a first UE, cause the first UE to: receive, from a second UE or a network node, a configuration for a resource pool, wherein the resource pool is associated with a PSFCH resource comprising more than two symbols; receive, from the second UE, a sidelink transmission; and transmit, to the second UE and based at least in part on the sidelink transmission, a HARQ-ACK feedback based at least in part on the PSFCH resource comprising more than two symbols.

In some implementations, a non-transitory computer-readable medium storing one or more instructions for wireless communication, the one or more instructions, when executed by one or more processors of a second UE, cause the second UE to: transmit, to a first UE, a configuration for a resource pool, wherein the resource pool is associated with a PSFCH resource comprising more than two symbols; transmit, to the first UE, a sidelink transmission; and receive, from the first UE and based at least in part on the sidelink transmission, a HARQ-ACK feedback based at least in part on the PSFCH resource comprising more than two symbols.

In some implementations, a first apparatus for wireless communication includes means for receiving, from a second apparatus or a network node, a configuration for a resource pool, wherein the resource pool is associated with a PSFCH resource comprising more than two symbols; means for receiving, from a second apparatus, a sidelink transmission; and means for transmitting, to the second apparatus and based at least in part on the sidelink transmission, a HARQ-ACK feedback based at least in part on the PSFCH resource comprising more than two symbols.

In some implementations, a second apparatus for wireless communication includes means for transmitting, to a first apparatus, a configuration for a resource pool, wherein the resource pool is associated with a PSFCH resource comprising more than two symbols; means for transmitting, to the first apparatus, a sidelink transmission; and means for receiving, from the first apparatus and based at least in part on the sidelink transmission, a HARQ-ACK feedback based at least in part on the PSFCH resource comprising more than two symbols.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
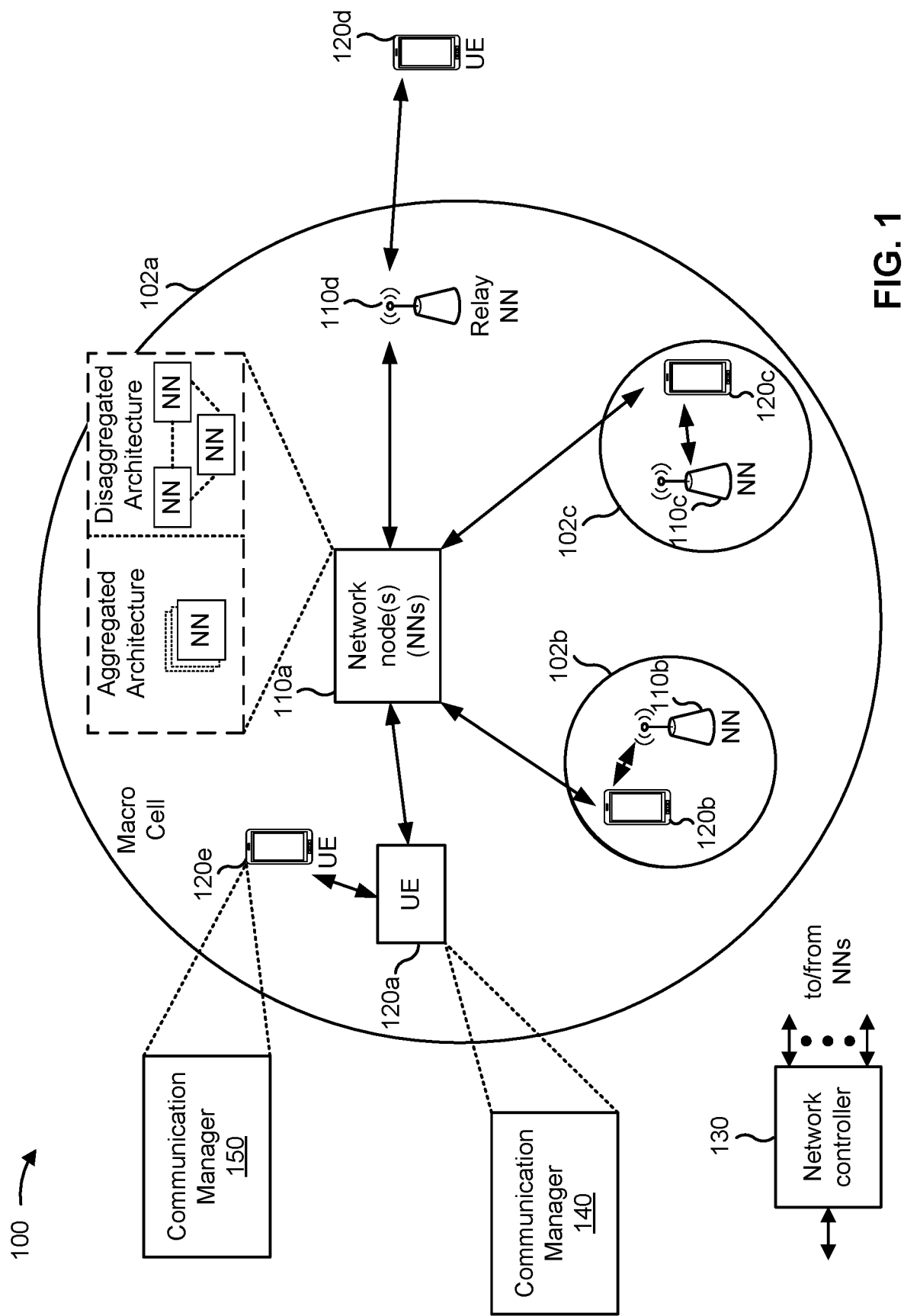
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120a) may include a communication manager 140. As described in more detail elsewhere herein, the communication manager 140 may receive, from a second UE or a network node, a configuration for a resource pool, wherein the resource pool is associated with a physical sidelink feedback channel (PSFCH) resource comprising more than two symbols; receive, from the second UE, a sidelink transmission; and transmit, to the second UE and based at least in part on the sidelink transmission, a hybrid automatic repeat request (HARQ) acknowledgement (ACK) feedback based at least in part on the PSFCH resource comprising more than two symbols. Additionally, or alternatively, the communication manager 140 may perform one or more other operations described herein.

In some aspects, a second UE (e.g., UE 120e) may include a communication manager 150. As described in more detail elsewhere herein, the communication manager 150 may transmit, to a first UE, a configuration for a resource pool, wherein the resource pool is associated with a PSFCH resource comprising more than two symbols; transmit, to the first UE, a sidelink transmission; and receive, from the first UE and based at least in part on the sidelink transmission, a HARQ-ACK feedback based at least in part on the PSFCH resource comprising more than two symbols. Additionally, or alternatively, the communication manager 150 may perform one or more other operations described herein.

As indicated above, FIG. 1 is provided as an example. Other examples may differ from what is described with regard to FIG. 1.

Figure 2:
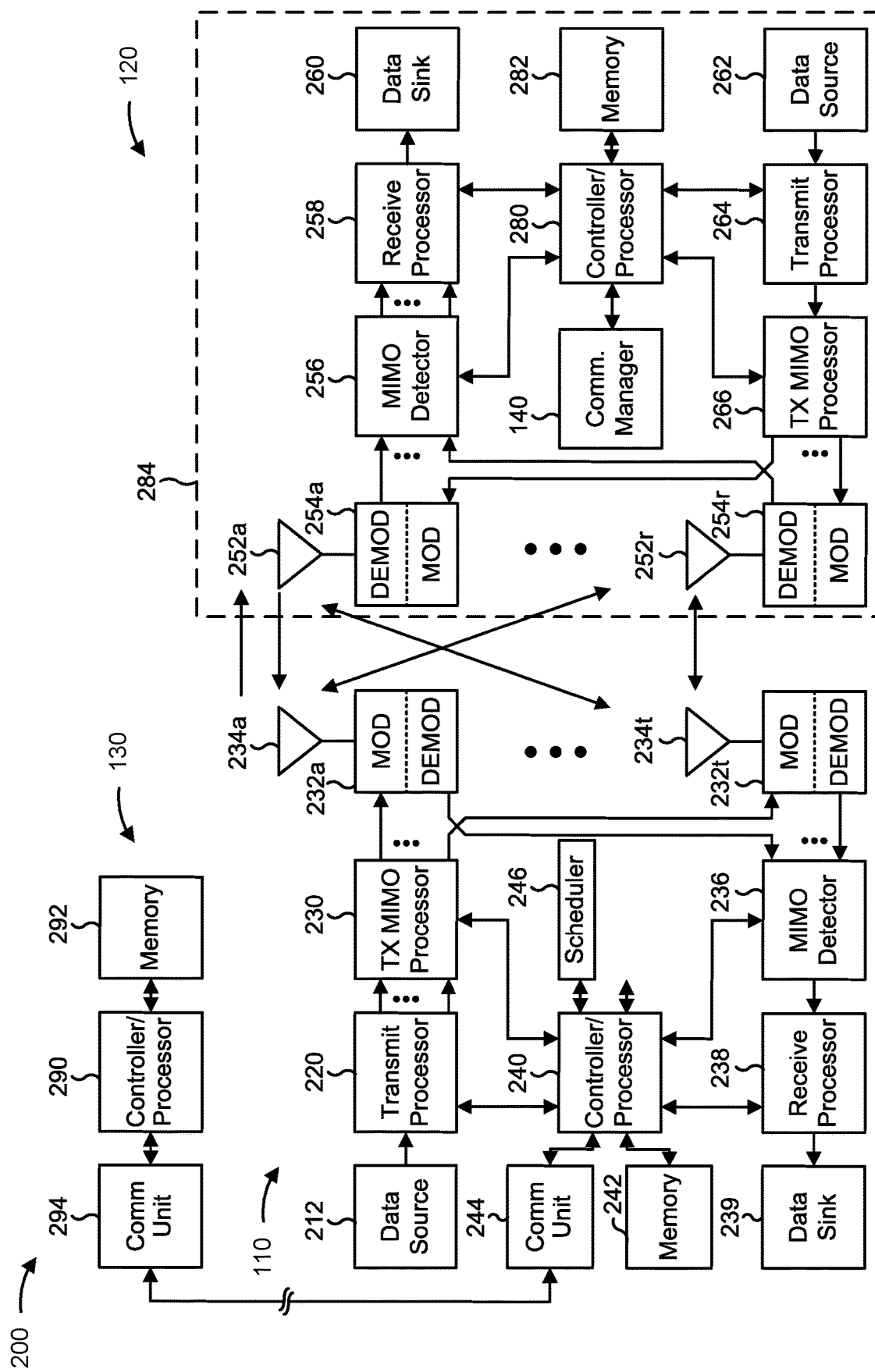
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-15).

The controller/processor 240 of the network node 110, the controller/processor 280 of the UE 120, and/or any other component(s) of FIG. 2 may perform one or more techniques associated with sidelink feedback channel resources having a plurality of symbols, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a first UE (e.g., UE 120a) includes means for receiving, from a second UE or a network node, a configuration for a resource pool, wherein the resource pool is associated with a PSFCH resource comprising more than two symbols; means for receiving, from the second UE, a sidelink transmission; and/or means for transmitting, to the second UE and based at least in part on the sidelink transmission, a HARQ-ACK feedback based at least in part on the PSFCH resource comprising more than two symbols. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120e) includes means for transmitting, to a first UE, a configuration for a resource pool, wherein the resource pool is associated with a PSFCH resource comprising more than two symbols; means for transmitting, to the first UE, a sidelink transmission; and/or means for receiving, from the first UE and based at least in part on the sidelink transmission, a HARQ-ACK feedback based at least in part on the PSFCH resource comprising more than two symbols. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
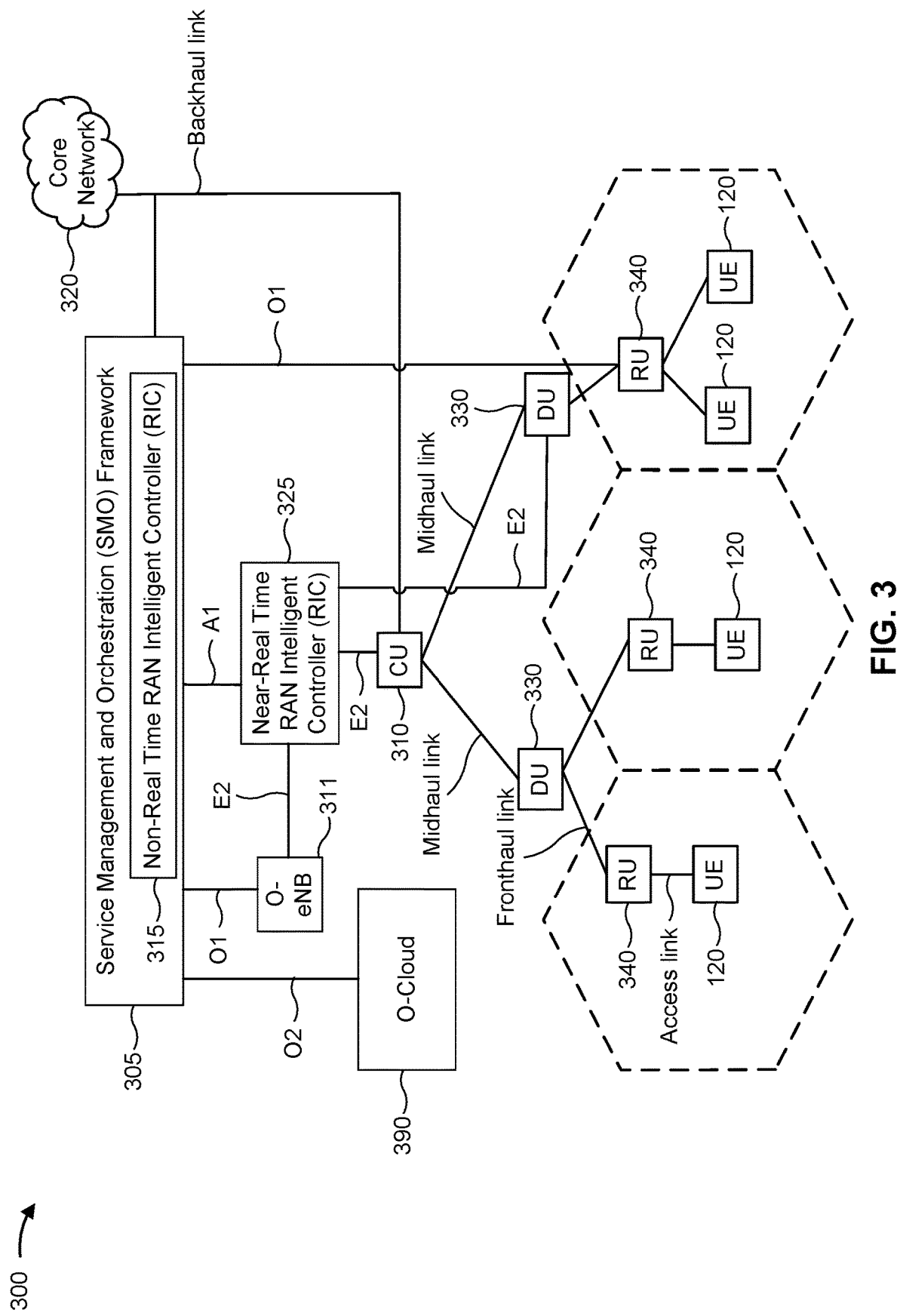
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

As indicated above, FIG. 3 is provided as an example. Other examples may differ from what is described with regard to FIG. 3.

Figure 4:
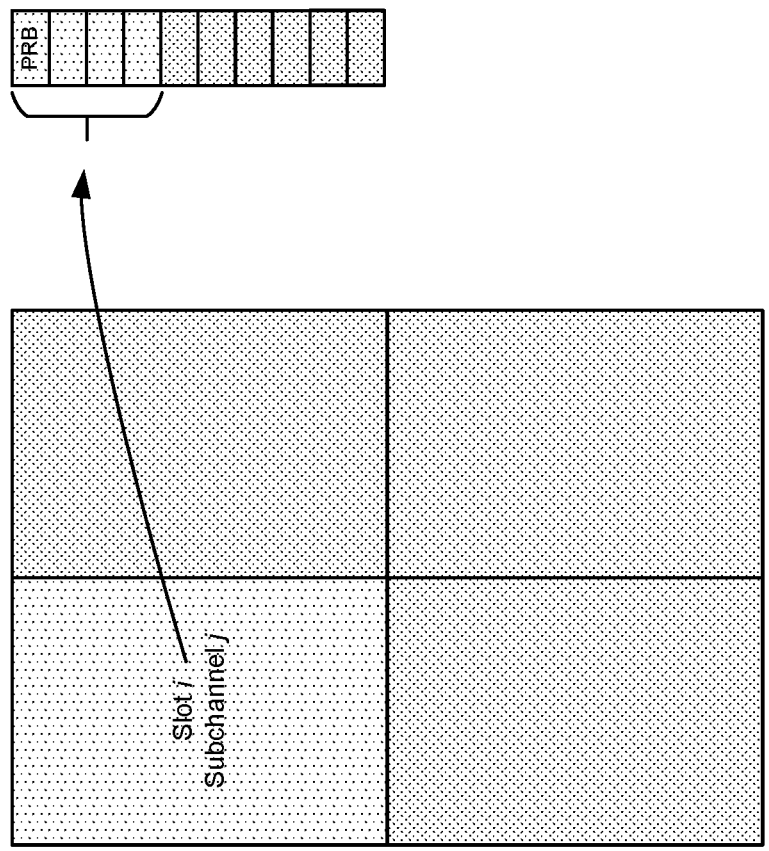
FIG. 4 is a diagram illustrating an example of a physical sidelink feedback channel (PSFCH) resource mapping, in accordance with the present disclosure.

FIG. 4 is a diagram illustrating an example 400 of a PSFCH resource mapping, in accordance with the present disclosure.

As shown in FIG. 4, a physical sidelink shared channel (PSSCH) may be associated with a slot i and a subchannel j. A mapping between the PSSCH and a corresponding PSFCH resource may be based at least in part on a starting subchannel of the PSSCH or a quantity of subchannels in the PSSCH, a slot containing the PSSCH, a source identifier, and a destination identifier. A sidelink PSFCH candidate resource type (sl-PSFCH-CandidateResourceType) may be configured as a starting subchannel (startSubCH) or as an allocated subchannel (allocSubCH). A quantity of available PSFCH resources must be equal to or greater than a quantity of UEs in groupcast option 2.

As indicated above, FIG. 4 is provided as an example. Other examples may differ from what is described with regard to FIG. 4.

Figure 5:
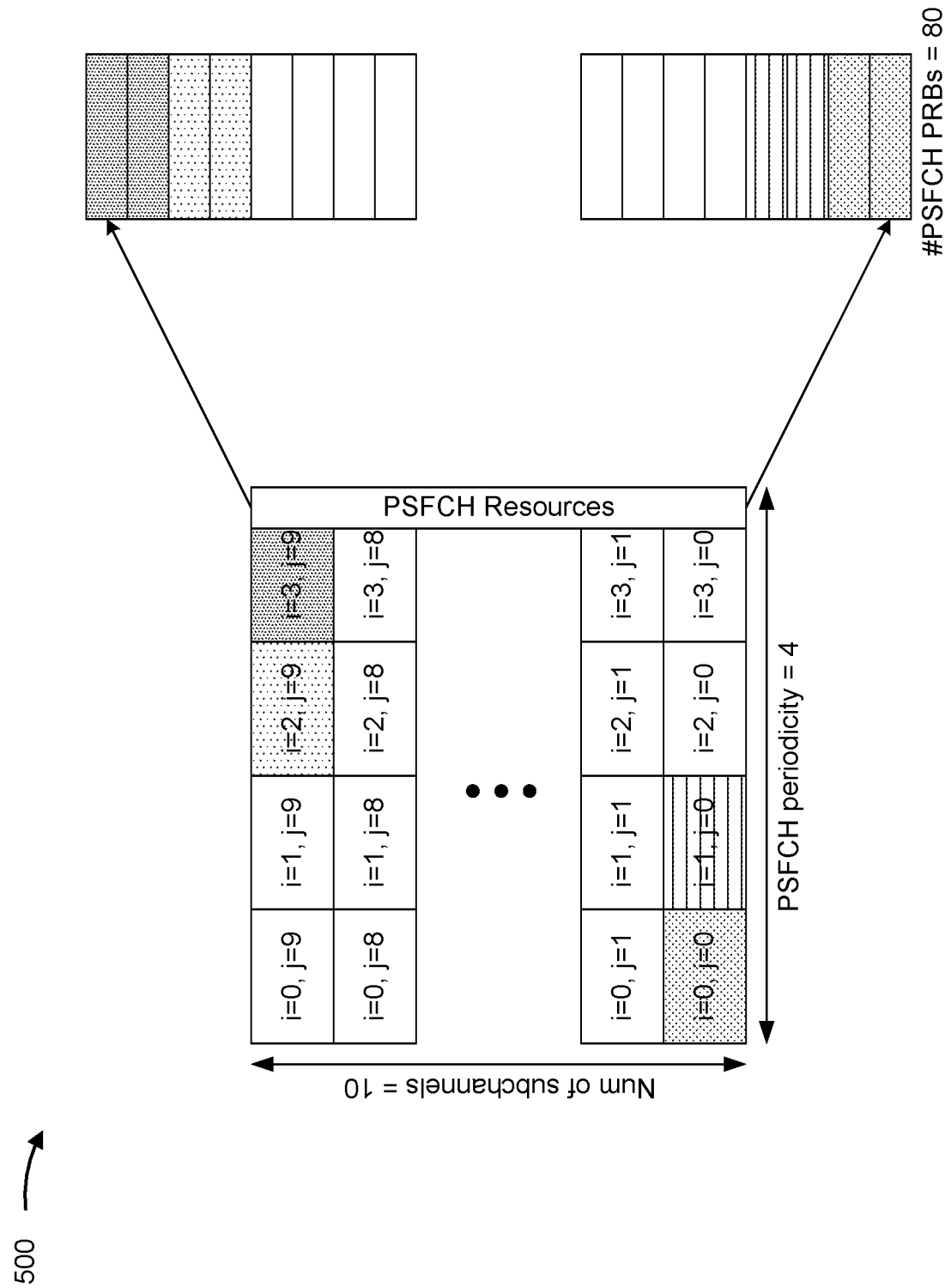
FIG. 5 is a diagram illustrating an example of determining a PSFCH resource, in accordance with the present disclosure.

FIG. 5 is a diagram illustrating an example 500 of determining a PSFCH resource, in accordance with the present disclosure.

A period PSFCH resource (periodPSFCHresource) parameter may indicate a PSFCH periodicity, in number of slots, in a sidelink resource pool. The period PSFCH resource parameter may be set to 0, 1, 2, or 4. When the period PSFCH resource parameter is set to 0, PSFCH transmissions from a UE in the sidelink resource pool may be disabled. The UE may transmit the PSFCH in a first slot that includes PSFCH resources and is at least a quantity of slots, as provided by a minimum time gap of a PSFCH (MinTimeGapPSFCH) parameter, of the sidelink resource pool after a last slot of a PSSCH reception. A resource block set PSFCH (rbSetPSFCH) parameter may indicate a set of $M_{PRB,set}^{PSFCH}$ set physical resource blocks (PRBs) in the sidelink resource pool for PSFCH transmission. A quantity of subchannels (numSubchannel) parameter may indicate a quantity of $N_{subch}$ sub-channels for the sidelink resource pool. A quantity of PSSCH slots associated with a PSFCH slot may be represented by $N_{PSSCH}^{PSFCH}$, and may be determined based at least in part on the period-PSFCHresource parameter. Further, $M_{PRB,set}^{PSFCH} = \alpha \cdot N_{subch} \cdot N_{PSSCH}$, where α represents an integer value and "·" represents a PSFCH multiplication operation. Further, $$M_{subch,slot}^{PSFCH} = \frac{M_{PRB,set}^{PSFCH}}{N_{subch} \cdot N_{PSSCH}^{PSFCH}}, \text{ where } M_{subch,slot}^{PSFCH}$$

represents a quantity of PSFCH PRBs for a sub-channel.

The UE may allocate $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH}-1]$ PRBs from $M_{PRB,set}^{PSFCH}$ PRBs to slot i and sub-channel j, where $0 \leq i \leq N_{PSSCH}^{PSFCH}$ and $0 \leq j \leq N_{subch}$.

In the example shown in FIG. 5, $N_{PSSCH}^{PSFCH}$ may be equal to four, which may correspond to a PSFCH periodicity. Further, $N_{subch}$ may be equal to ten, which may correspond to a quantity of subchannels for the sidelink resource pool. Further, $M_{subch,slot}^{PSFCH}$ may correspond to $$\frac{80}{4 \times 10},$$

which is equal to two. In other words, each sub-channel may be associated with two PSFCH PRBs, which may correspond to 80 PRBs for the PSFCH. In this example, each sub-channel may be associated with two PSFCH PRBs, but the PSFCH may be sent on one of the PSFCH PRBs.

As indicated above, FIG. 5 is provided as an example. Other examples may differ from what is described with regard to FIG. 5.

Figure 6:
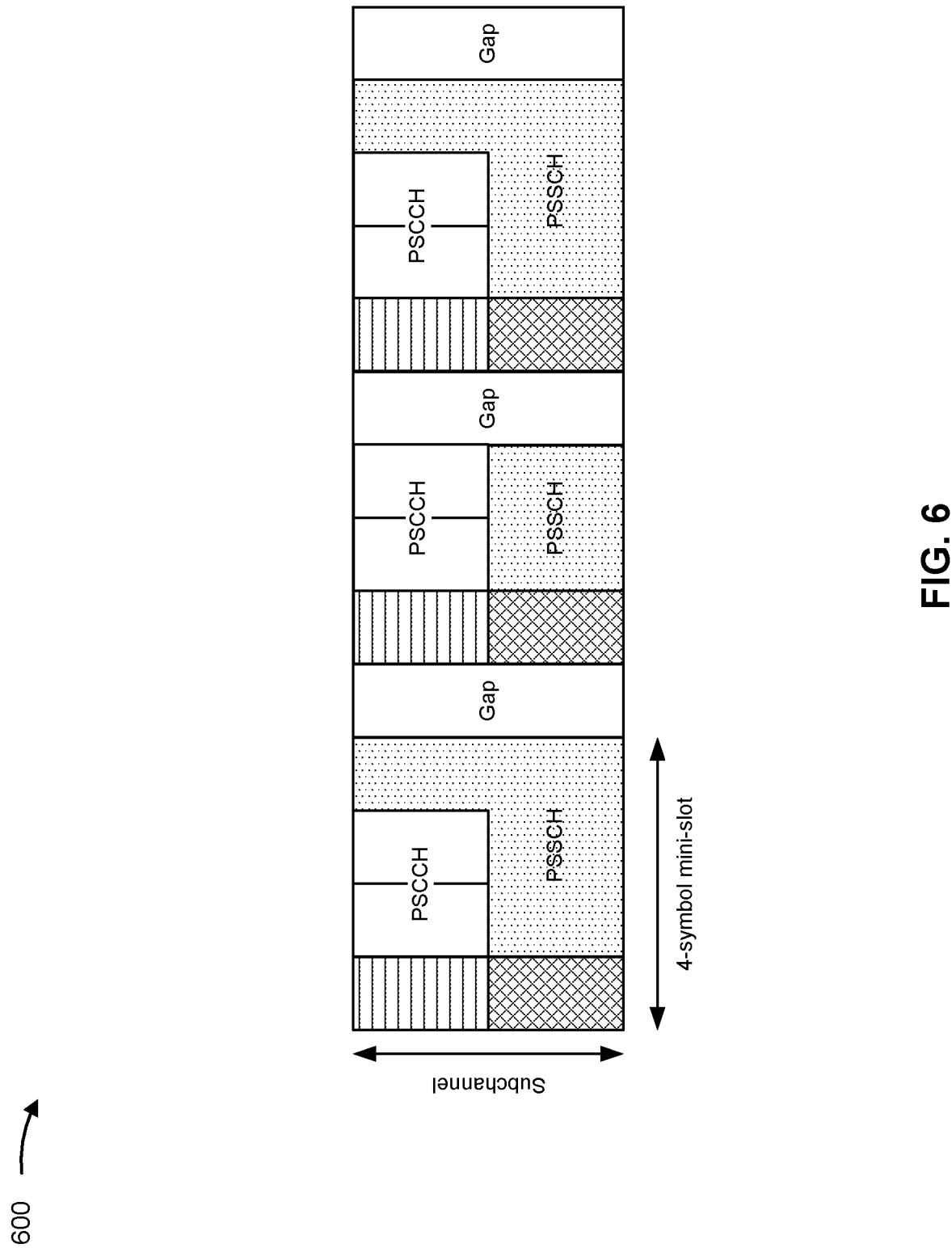
FIG. 6 is a diagram illustrating an example of a mini-slot scheduling, in accordance with the present disclosure.

FIG. 6 is a diagram illustrating an example 600 of a mini-slot scheduling, in accordance with the present disclosure.

As shown in FIG. 6, a mini-slot scheduling may reduce a scheduling and turnaround time for sidelink communications. Each slot may be split into multiple sub-slots, where each sub-slot may have a physical sidelink control channel (PSCCH) and/or a PSSCH, and where each sub-slot may be self-schedulable and decodable. Each UE may select and reserve one or multiple sub-slots per slot. As a quantity of sub-slots increases per slot, which may enhance a scheduling latency and may be suitable for small packets (e.g., 32 bytes for IIoT), an increasing quantity of symbols should be allocated to gaps. For some use cases (e.g., if a large quantity of UEs need to be supported), such overhead may degrade the latency reduction gains.

As indicated above, FIG. 6 is provided as an example. Other examples may differ from what is described with regard to FIG. 6.

Figure 7:
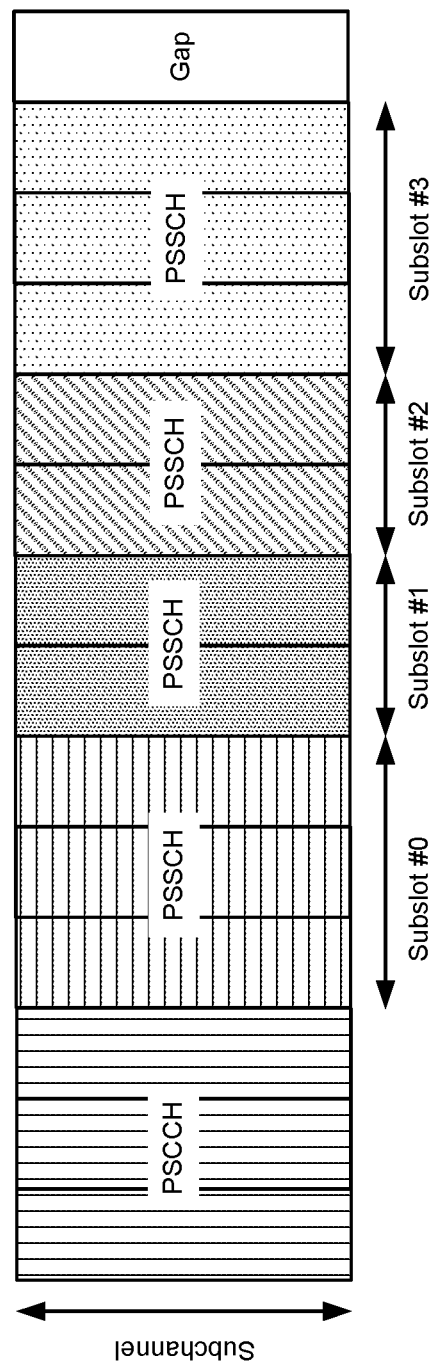
FIG. 7 is a diagram illustrating an example of a multiple sub-slot design, in accordance with the present disclosure.

FIG. 7 is a diagram illustrating an example 700 of a multiple sub-slot design, in accordance with the present disclosure.

As shown in FIG. 7, a slot may be split into multiple sub-slots according to a given pattern (e.g., a length for each sub-slot and a quantity of sub-slots per slot). A sidelink control information type 1 (SCI-1) or PSCCH may only be at a beginning of each slot. Each SCI may indicate a transmission/reservation of a quantity of sub-slots in the same slot or in upcoming slots. The slot may include multiple sub-slots (e.g., sub-slot #0, sub-slot #1, sub-slot #2, and sub-slot #3) associated with PSSCHs. Automatic gain control (AGC) symbols may not be needed in the slot since a receiver may set the AGC based at least in part on a first symbol of the slot, and a same setting may be used for a reception of any of the PSSCH sub-slots. The slot may include a gap at an end of the slot, where the gap may be used for a Tx/Rx switching at a slot boundary in sidelink.

As indicated above, FIG. 7 is provided as an example. Other examples may differ from what is described with regard to FIG. 7.

In a V2X system, a PSFCH resource may be a two-symbol duration, where a first symbol may be used for AGC training and a second symbol may be used to transmit hybrid automatic repeat request (HARQ) acknowledgement (ACK) feedback. The first symbol and the second symbol may be OFDM symbols. However, such a scheme may be insufficient for maintaining an ultra-reliable low latency communication (URLLC) quality of service (QoS) requirement. Since a sidelink may support URLLC, industrial IoT (IIoT), and/or extended reality (XR) applications, an enhancement to a PSFCH resource may be needed to increase a reliability of a HARQ-ACK feedback transmission, and to allow for CSI to be signaled in the PSFCH resource for a relatively quick feedback. The CSI may indicate a channel quality indicator (CQI), a rank indicator (RI), and/or power commands. URLLC, IIoT, and/or XR applications may have a diverse set of latency/reliability requirements, and the two-symbol duration may not provide a sufficient HARQ-ACK feedback reliability. The two-symbol duration of the PSFCH resource may not be sufficient, since one symbol may be used for AGC training, and a potential loss of the PSFCH resource may occur due to collisions between PSFCH transmissions.

In various aspects of techniques and apparatuses described herein, a first UE (e.g., an Rx UE) may receive, from a second UE (e.g., a Tx UE that acts as a primary UE) or a network node, a configuration for a resource pool. The resource pool may be associated with a PSFCH resource comprising more than two symbols. The first UE may receive, from the second UE, a sidelink transmission. The first UE may transmit, to the second UE and based at least in part on the sidelink transmission, a HARQ-ACK feedback based at least in part on the PSFCH resource comprising more than two symbols. A first portion of the PSFCH resource comprising more than two symbols may be used for an AGC training, and a second portion of the PSFCH resource comprising more than two symbols may be used for transmitting the HARQ-ACK feedback.

In some aspects, to improve a HARQ-ACK feedback reliability, adding more symbols in the PSFCH resource and repeating a HARQ-ACK feedback transmission may be important for maintaining an URLLC QoS requirement. To further improve the reliability, channel state information (CSI) from a PSSCH may be derived, and the PSFCH resource may be used for signaling the CSI. Thus, a quantity of symbols and PRBs may be increased in the PSFCH resource.

In some aspects, various PSFCH improvements described herein may support various consumer cases for a sidelink, as well as URLLC, IIoT, and/or XR applications. The PSFCH improvements described herein may consider a diverse set of latency/reliability requirements associated with URLLC, IIoT, and/or XR services. With the expansion of sidelink to non-V2X use cases, such as IIoT and consumer use cases (e.g., XR or smart wearables), the PSFCH improvements described herein may define sidelink schemes that support low latency and high reliability communications. The PSFCH improvements described herein may be associated with an increase in PSFCH symbols in the PSFCH resource, a PSFCH PRB assignment, a sidelink configuration, AGC symbol considerations, and/or a PRB selection design.

Figure 8:
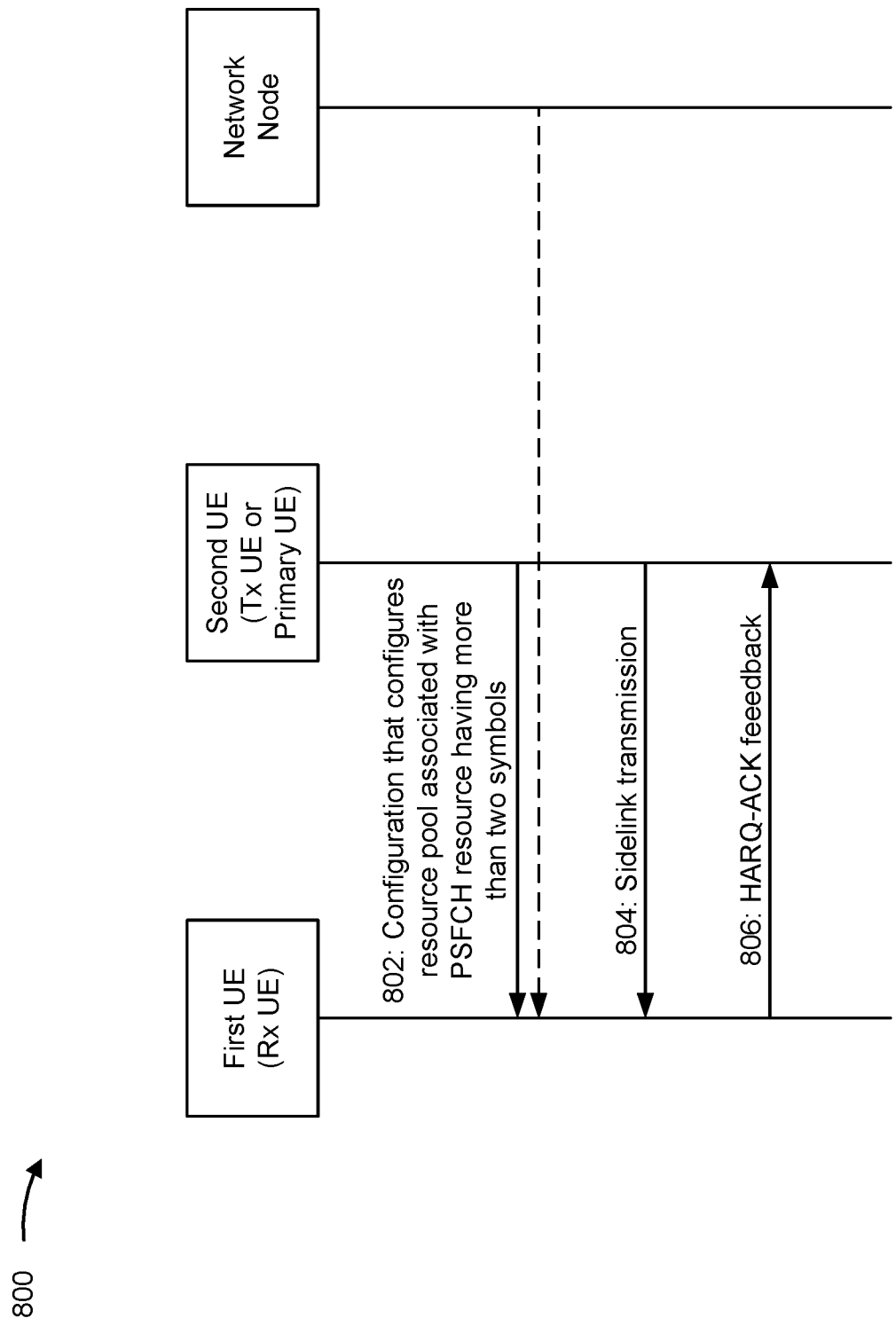
FIGS. 8-11 are diagrams illustrating examples associated with sidelink feedback channel resources having a plurality of symbols, in accordance with the present disclosure.

FIG. 8 is a diagram illustrating an example 800 associated with sidelink feedback channel resources having a plurality of symbols, in accordance with the present disclosure. As shown in FIG. 8, communication may occur between a first UE (e.g., UE 120*a*) and a second UE (e.g., UE 120*e*). In some aspects, the first UE and the second UE may be included in a wireless network, such as wireless network 100.

In some aspects, the first UE may be an Rx UE that receives a sidelink transmission. As non-limiting examples, the first UE may be smart glasses or a smartwatch. The second UE may be a Tx UE that transmits the sidelink transmission. The second UE may be a primary UE that controls a plurality of UEs including the first UE. The first UE and the second UE may communicate directly with a network node (not shown in FIG. 8), or the first UE may communicate with the network node via the second UE.

As shown by reference number 802, the first UE may receive, from the second UE or the network node, a configuration for a resource pool. The resource pool may be associated with a PSFCH resource comprising more than two symbols. A first portion of the PSFCH resource comprising more than two symbols may be used for an AGC training, and a second portion of the PSFCH resource comprising more than two symbols may be used for transmitting HARQ-ACK feedback. A size of the PSFCH resource may be defined by X+1, where X={1, 2, ... }, with a default value of X=1 (as in a legacy design). In other words, as a default, the size of the PSFCH resource may be two symbols, but the size of the PSFCH resource may be increased to more than two symbols, which may improve a reliability when transmitting the HARQ-ACK feedback.

As shown by reference number 804, the first UE may receive, from the second UE, a sidelink transmission. The first UE may receive the sidelink transmission from the second UE via a sidelink interface between the first UE and the second UE. The first UE may receive the sidelink transmission via a PSSCH or a PSCCH.

As shown by reference number 806, the first UE may transmit, to the second UE and based at least in part on the sidelink transmission, the HARQ-ACK feedback based at least in part on the PSFCH resource comprising more than two symbols. The first UE may transmit the HARQ-ACK feedback using the second portion of the PSFCH resource comprising more than two symbols.

In some aspects, the first UE may determine a PRB of the PSFCH resource comprising more than two symbols based at least in part on a function of a source identifier, a destination identifier, a quantity of PRBs in a frequency domain and a quantity of symbols in a time domain. The first UE may transmit the HARQ-ACK feedback using the PRB. In other words, the PRB used for transmitting the HARQ-ACK feedback may be based at least in part on a frequency domain dimension and a time domain dimension. The quantity of symbols in the time domain may exclude an AGC symbol.

In some aspects, the first UE may determine a plurality of PRBs of the PSFCH resource comprising more than two symbols based at least in part on a mini-slot index. The mini-slot index may be used to assign the plurality of PRBs on different symbols of different mini-slots. Each PRB may be used for a mini-slot HARQ-ACK feedback. A quantity of the different symbols may be equal to a quantity of the different mini-slots, or alternatively, a quantity of the different symbols may be less than a quantity of the different mini-slots, and two or more PRBs may be assigned per symbol.

In some aspects, the first UE may receive, from the second UE or the network node, an indication associated with a scheduling of the HARQ-ACK feedback. The indication may indicate a time and a frequency associated with one or more PRBs of the PSFCH resource comprising more than two symbols. The first UE may transmit the HARQ-ACK feedback based at least in part on the indication. In other words, the first UE may transmit the HARQ-ACK feedback using the one or more PRBs, which may be associated with the time and frequency as indicated by the indication.

In some aspects, the first UE may receive, from the network node, a configuration for a per bit repetition factor for the resource pool. The per bit repetition factor may be based at least in part on a priority or a QoS of the sidelink transmission. In some aspects, the first UE may receive, from the second UE, an indication of the per bit repetition factor for the resource pool, where the per bit repetition factor may be selected from a plurality of potential per bit repetition factors. The per bit repetition factor may be based at least in part on a CSI measurement, or a priority or a QoS of the sidelink transmission.

As indicated above, FIG. 8 is provided as an example. Other examples may differ from what is described with regard to FIG. 8.

In some aspects, a size of PSFCH resources may be increased from two symbols to more than two symbols (e.g., more than two OFDM symbols). An increase to the size of PSFCH resources may be defined by X+1, where X={1, 2, . . . }, with a default value of X=1 (as in a legacy design). In other words, as a default, the size of PSFCH resources may be two symbols, but the size of the PSFCH resources may be increased to more than two symbols, which may improve the reliability of the HARQ-ACK feedback transmission. A greater quantity of PSFCH symbols, which may correspond to additional resources, may improve the reliability of the HARQ-ACK feedback transmission. A first symbol may be used for AGC training by being a repetition of a second symbol (e.g., a first symbol of X symbols).

Figure 9:
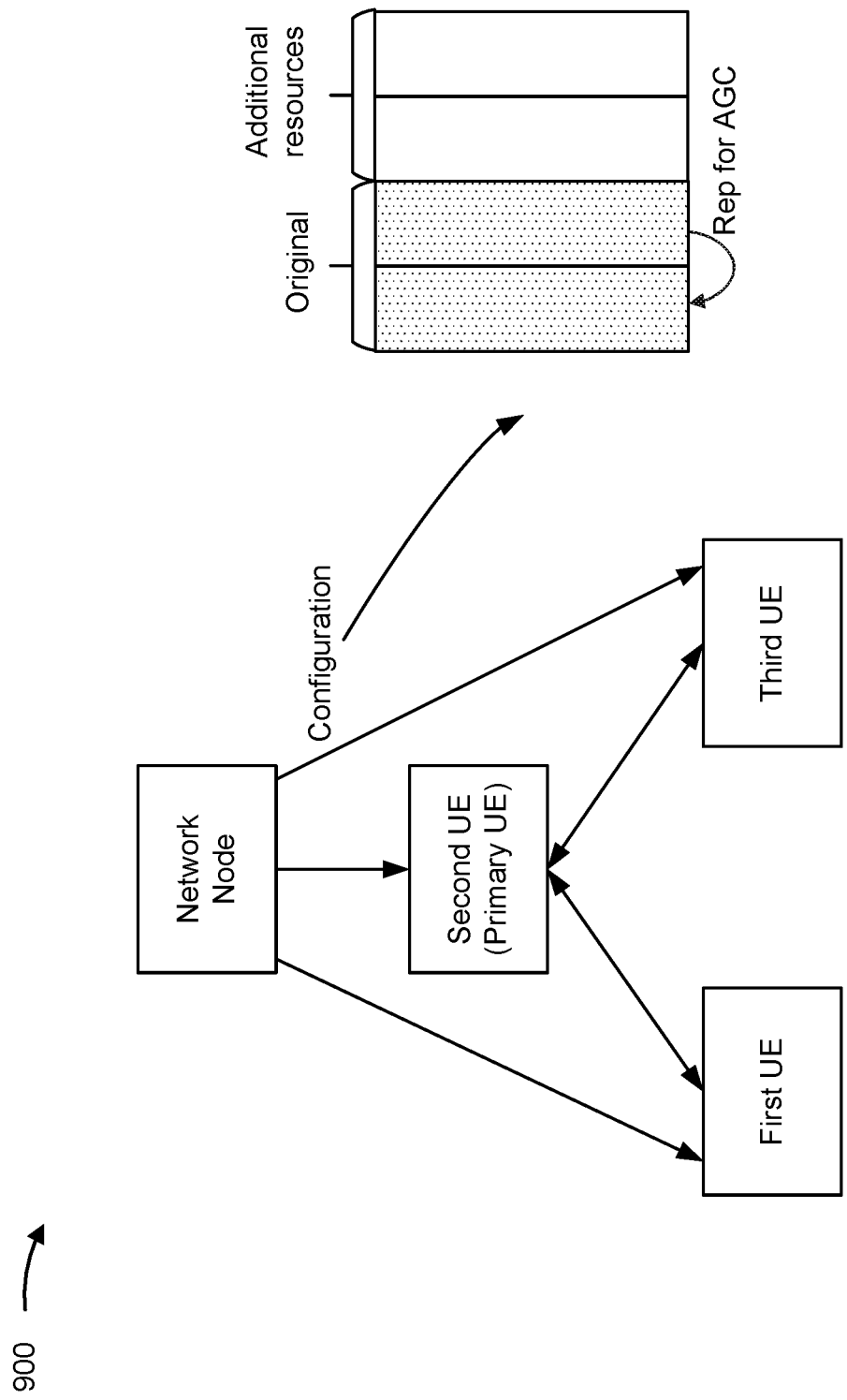

FIG. 9 is a diagram illustrating an example 900 associated with sidelink feedback channel resources having a plurality of symbols, in accordance with the present disclosure.

As shown in FIG. 9, a plurality of UEs may receive, from a network node, transmit a configuration for a resource pool associated with PSFCH resources with X+1 symbols, where X=1 is a legacy design. A size of the PSFCH resources may be more than two symbols, where a first symbol may be used for AGC by being a repetition of a second symbol (e.g., a first symbol of X symbols). For example, the PSFCH resources may include a first two symbols (e.g., original symbols), as well as two additional symbols (e.g., additional resources), based at least in part on the configuration.

In some aspects, the plurality of UEs may include a first UE (e.g., a first Rx UE, such as smart glasses), a second UE (e.g., a Tx UE or primary UE), and a third UE (e.g., a second Rx UE, such as a smartwatch). The second UE and/or the third UE may receive the configuration directly from the network node, or the second UE and/or the third UE may receive the configuration from the first UE, which may have received the configuration from the network node.

In some aspects, the first UE may transmit, to the second UE or the third UE, a sidelink transmission. The second UE or the third UE may transmit, to the first UE, a HARQ-ACK feedback with improved reliability based at least in part on the resource pool configured with X+1 symbols. The UE may transmit the HARQ-ACK feedback using the PSFCH resources associated with the X+1 symbols.

As indicated above, FIG. 9 is provided as an example. Other examples may differ from what is described with regard to FIG. 9.

Figure 10:
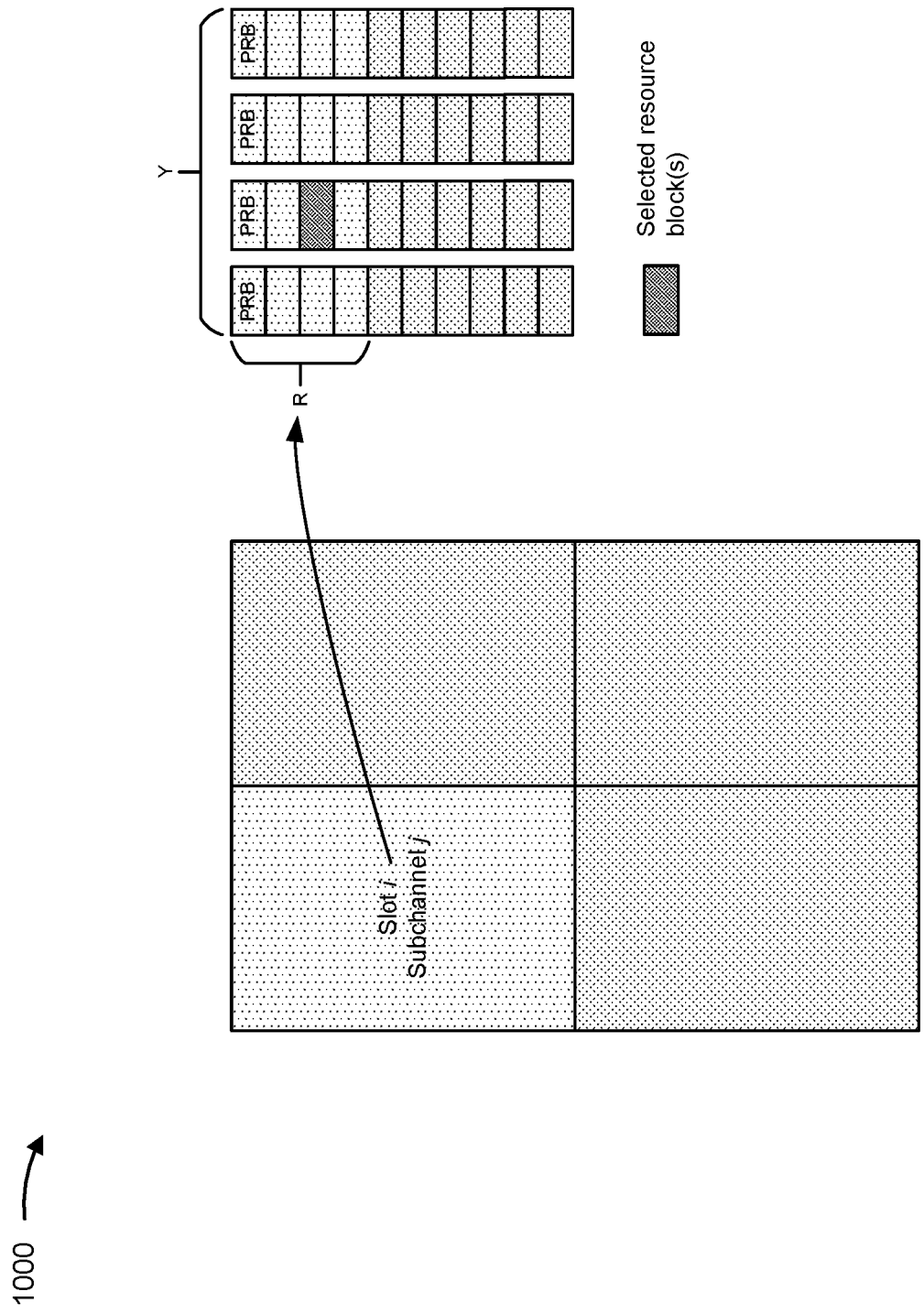

FIG. 10 is a diagram illustrating an example 1000 associated with sidelink feedback channel resources having a plurality of symbols, in accordance with the present disclosure.

As shown in FIG. 10, a PSFCH may include multiple PSFCH symbols in a time domain. A PRB within a PSFCH symbol may be selected based at least in part on i=mod (source ID+destination ID, R), where R is a quantity of PRBs that a first UE (e.g., an Rx UE) may use in a frequency domain. The PRB within the PSFCH symbol may be selected for transmitting a HARQ-ACK feedback. When selecting the PRB within the PSFCH symbol, a new index for time may be added to incorporate the time domain. The new index for time may be defined as j=F(source ID, destination ID, Y). For example, F(source ID, destination ID, Y)=mod (source ID+destination ID+configured parameters, Y), where Y is a quantity of symbols in a PSFCH in the time domain (or those allocated for the first UE to use within a PSFCH resource), and Y excludes an AGC symbol. Further, F(.) may be any function, such as a mod operation. As a result, a time-domain dimension may be added when determining the PSFCH resource.

As indicated above, FIG. 10 is provided as an example. Other examples may differ from what is described with regard to FIG. 10.

In some aspects, in a mini-slot scenario, a first UE (e.g., an Rx UE) may use a mini-slot index to assign PRBs on different PSFCH symbols (e.g., assign feedback bit(s) to PRBs across symbols) of a mini-slot, assuming that a quantity of PSFCH symbols is equal to a quantity of mini-slots. When the quantity of PSFCH symbols is less than the quantity of mini-slots, then more than one mini-slot feedback (e.g., HARQ-ACK feedback and CSI feedback) may be assigned to the same symbols (e.g., the first UE may use two or more PRBs per symbol).

Figure 11:
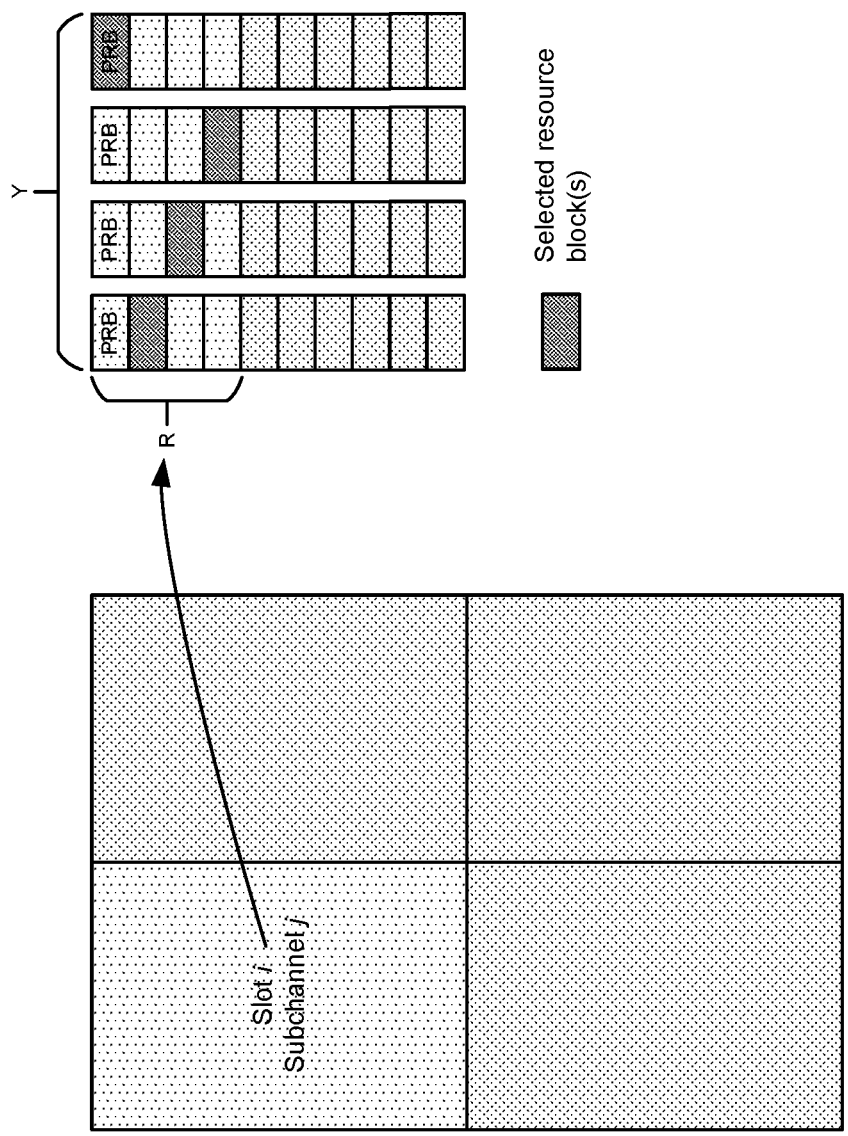

FIG. 11 is a diagram illustrating an example 1100 associated with sidelink feedback channel resources having a plurality of symbols, in accordance with the present disclosure.

As shown in FIG. 11, a PSFCH may include multiple PSFCH symbols in a time domain. For a 4 mini-slot case, mod (source ID+destination ID+mini-slot index+offset (depending on R)) may equal one. Four different PRBs of the 4 mini-slots may be assigned on different PSFCH symbols, and a sequence of HARQ-ACK feedback bits may be obtained. The sequence of bits may correspond to a HARQ-ACK feedback with improved reliability. Each PRB may be used for a mini-slot HARQ-ACK feedback. In some aspects, if a quantity of mini-slots is five, then a first PSFCH symbol may have two feedback bits/occasions. The feedback bits may be multiplexed on a same PRB using a single cyclic shift, or different cyclic shifts may be assigned to each feedback bit. In some cases, a PRB offset may be added for each Y assignment (e.g., for an assignment of Y symbols), where the offset may be RRC level configured or agreed upon between different UEs.

As indicated above, FIG. 11 is provided as an example. Other examples may differ from what is described with regard to FIG. 11.

In some aspects, a second UE (e.g., a Tx UE or primary UE) may schedule a PSFCH transmission of a first UE (e.g., an Rx UE) using sidelink control information type 2 (SCI-2). The second UE may determine which PRB or set of PRBs is used by the first UE. Alternatively, the second UE may schedule the PSFCH transmission of the first UE using SCI-1, so that other UEs may overhear this information to avoid using the same PRB or set of PRBs. Each second UE may constitute a small cell or a mini network node. The second UE, which may be a centralized node controlling a plurality of UEs, may indicate a time-frequency resource for a first UE to use for transmitting HARQ-ACK feedback, where the time-frequency resource may be associated with the PRB. The second UE may transmit an indication of indices (i,j) associated with the PRB, where the indices may be associated with Y symbols of a PSFCH in a time domain and R PRBs of the PSFCH in a frequency domain. The indication may indicate a particular PRB (or set of PRBs) within the Y symbols of the PSFCH in the time domain and the R PRBs of the PSFCH in the frequency domain (for example, as shown in FIG. 10).

In some aspects, in a sidelink mode 1, a network node may transmit downlink control information (DCI) to a first UE. The DCI may indicate the indices (i,j) associated with the PRB. The DCI may indicate the PRB (or set of PRBs) within the Y symbols of the PSFCH in the time domain and the R PRBs of the PSFCH in the frequency domain. The first UE may use the indicated PRB when transmitting HARQ-ACK feedback.

In some aspects, to improve a reliability of HARQ-ACK bits, a HARQ-ACK bit may be transmitted multiple times based at least in part on a per bit repetition, such that a first UE (e.g., an Rx UE) may use y PRBs to transmit a bit y times. A network node may configure a resource pool to have a per bit repetition factor. The network node may configure the first UE with the per bit repetition factor. The per bit repetition factor may be configured via a PC5 interface. The per bit repetition factor may be configured via RRC signaling or a medium access control control element (MAC-CE). The per bit repetition factor may be common or valid to any resource pool. The per bit repetition factor may change based at least in part on a priority and/or a QoS of an underlying transmission. For example, a first priority may have a per bit repetition factor of one, a second priority may have a per bit repetition factor of two, and so on.

In some aspects, a second UE (e.g., a Tx UE or primary UE) may determine the per bit repetition factor based at least in part on CSI measurements and/or a priority/QoS of a transmission. The second UE may indicate the per bit repetition factor using one of two options. In a first option, a network node may configure potential per bit repetition factors as part of a resource pool configuration, and then the second UE may configure a first UE (e.g., an Rx UE) with one of the per bit repetition factors from the potential per bit repetition factors. In a second option, the second UE may indicate the per bit repetition factor to the first UE in SCI-2.

Figure 12:
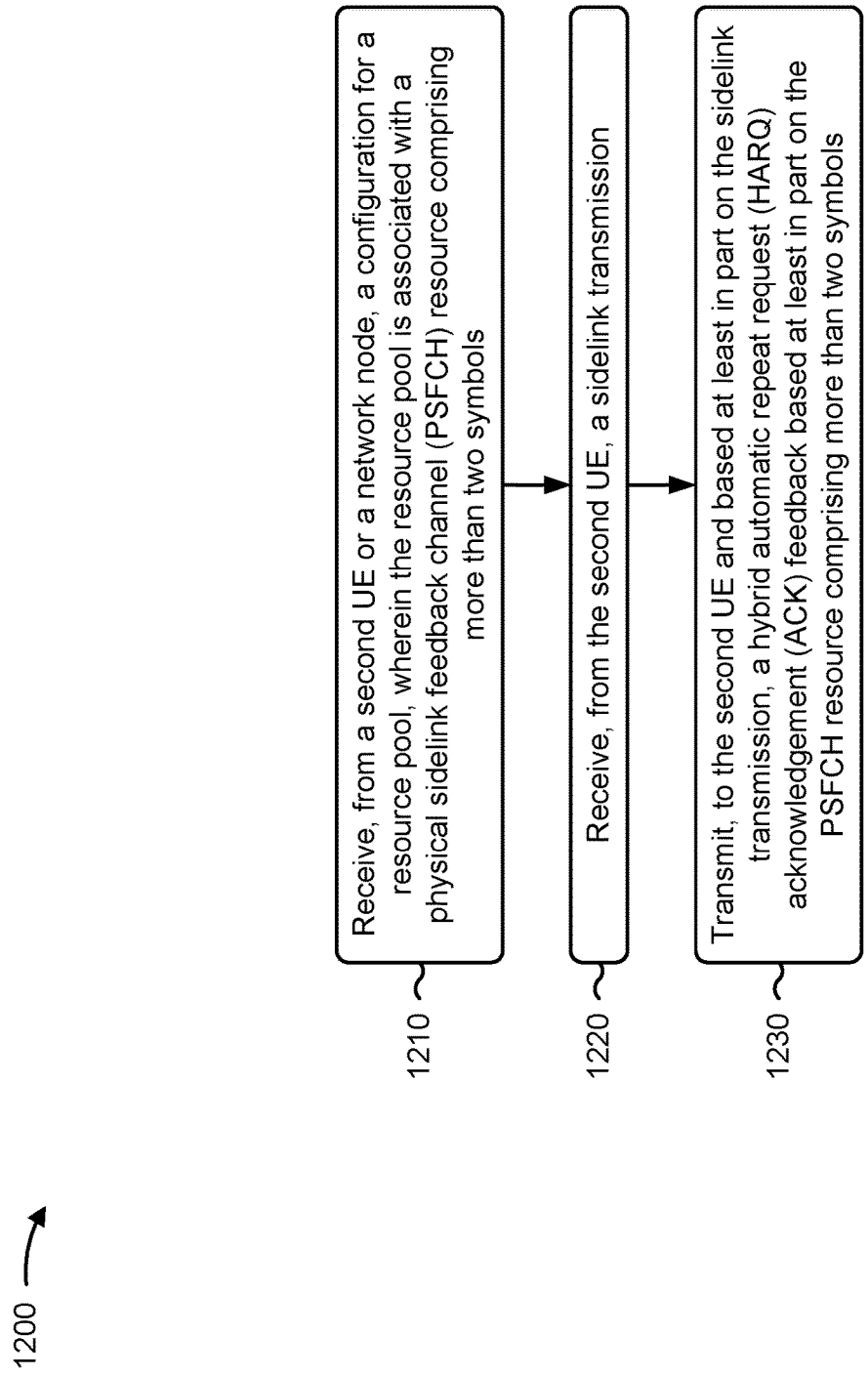
FIGS. 12-13 are diagrams illustrating example processes associated with sidelink feedback channel resources having a plurality of symbols, in accordance with the present disclosure.

FIG. 12 is a diagram illustrating an example process 1200 performed, for example, by a first UE, in accordance with the present disclosure. Example process 1200 is an example where the first UE (e.g., UE 120a) performs operations associated with sidelink feedback channel resources having a plurality of symbols.

As shown in FIG. 12, in some aspects, process 1200 may include receiving, from a second UE or a network node, a configuration for a resource pool, wherein the resource pool is associated with a PSFCH resource comprising more than two symbols (block 1210). For example, the first UE (e.g., using communication manager 140 and/or reception component 1402, depicted in FIG. 14) may receive, from a second UE or a network node, a configuration for a resource pool, wherein the resource pool is associated with a PSFCH resource comprising more than two symbols, as described above.

As further shown in FIG. 12, in some aspects, process 1200 may include receiving, from the second UE, a sidelink transmission (block 1220). For example, the first UE (e.g., using communication manager 140 and/or reception component 1402, depicted in FIG. 14) may receive, from the second UE, a sidelink transmission, as described above.

As further shown in FIG. 12, in some aspects, process 1200 may include transmitting, to the second UE and based at least in part on the sidelink transmission, a HARQ-ACK feedback based at least in part on the PSFCH resource comprising more than two symbols (block 1230). For example, the first UE (e.g., using communication manager 140 and/or transmission component 1404, depicted in FIG. 14) may transmit, to the second UE and based at least in part on the sidelink transmission, a HARQ-ACK feedback based at least in part on the PSFCH resource comprising more than two symbols, as described above.

Process 1200 may include additional aspects, such as any single aspect or any combination of aspects described below and/or in connection with one or more other processes described elsewhere herein.

In a first aspect, a first portion of the PSFCH resource comprising more than two symbols is used for an AGC training, and a second portion of the PSFCH resource comprising more than two symbols is used for transmitting the HARQ-ACK feedback.

In a second aspect, alone or in combination with the first aspect, process 1200 includes determining a PRB of the PSFCH resource comprising more than two symbols based at least in part on a function of a source identifier, a destination identifier, a quantity of PRBs in a frequency domain and a quantity of symbols in a time domain, wherein the HARQ-ACK feedback is transmitted using the PRB, and the quantity of symbols in the time domain excludes an AGC symbol.

In a third aspect, alone or in combination with one or more of the first and second aspects, process 1200 includes determining a plurality of PRBs of the PSFCH resource comprising more than two symbols based at least in part on a mini-slot index, wherein the mini-slot index is used to assign the plurality of PRBs on different symbols of different mini-slots, and each PRB is used for a mini-slot HARQ-ACK feedback.

In a fourth aspect, alone or in combination with one or more of the first through third aspects, a quantity of the different symbols is equal to a quantity of the different mini-slots.

In a fifth aspect, alone or in combination with one or more of the first through fourth aspects, a quantity of the different symbols is less than a quantity of the different mini-slots, and two or more PRBs are assigned per symbol.

In a sixth aspect, alone or in combination with one or more of the first through fifth aspects, process 1200 includes receiving, from one of the second UE or the network node, an indication associated with a scheduling of the HARQ-ACK feedback, wherein the indication indicates a time and a frequency associated with one or more PRBs of the PSFCH resource comprising more than two symbols, and the HARQ-ACK feedback is transmitted based at least in part on the indication.

In a seventh aspect, alone or in combination with one or more of the first through sixth aspects, process 1200 includes receiving, from the network node, a configuration for a per bit repetition factor for the resource pool, wherein the per bit repetition factor is based at least in part on a priority or a QoS of the sidelink transmission.

In an eighth aspect, alone or in combination with one or more of the first through seventh aspects, process 1200 includes receiving, from the second UE, an indication of a per bit repetition factor for the resource pool, wherein the per bit repetition factor is based at least in part on a CSI measurement, or a priority or a QoS of the sidelink transmission.

In a ninth aspect, alone or in combination with one or more of the first through eighth aspects, the first UE is an Rx UE that receives the sidelink transmission, wherein the second UE is a Tx UE that transmits the sidelink transmission, and the second UE is a primary UE that controls a plurality of UEs including the first UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
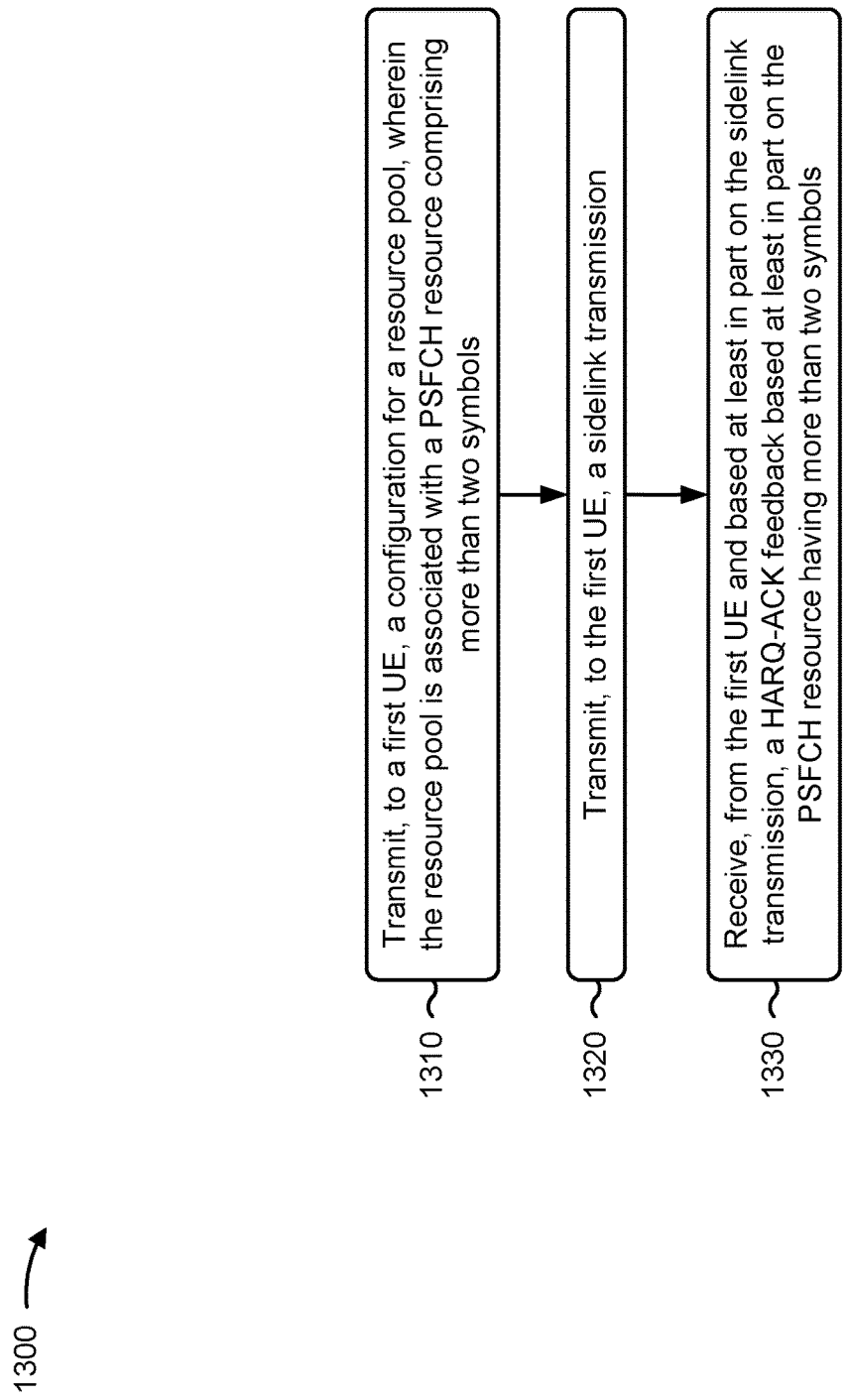

FIG. 13 is a diagram illustrating an example process 1300 performed, for example, by a second UE, in accordance with the present disclosure. Example process 1300 is an example where the second UE (e.g., UE 120e) performs operations associated with sidelink feedback channel resources having a plurality of symbols.

As shown in FIG. 13, in some aspects, process 1300 may include transmitting, to a first UE, a configuration for a resource pool, wherein the resource pool is associated with a PSFCH resource comprising more than two symbols (block 1310). For example, the second UE (e.g., using communication manager 140 and/or transmission component 1504, depicted in FIG. 15) may transmit, to a first UE, a configuration for a resource pool, wherein the resource pool is associated with a PSFCH resource comprising more than two symbols, as described above.

As further shown in FIG. 13, in some aspects, process 1300 may include transmitting, to the first UE, a sidelink transmission (block 1320). For example, the second UE (e.g., using communication manager 140 and/or transmission component 1504, depicted in FIG. 15) may transmit, to the first UE, a sidelink transmission, as described above.

As further shown in FIG. 13, in some aspects, process 1300 may include receiving, from the first UE and based at least in part on the sidelink transmission, a HARQ-ACK feedback based at least in part on the PSFCH resource comprising more than two symbols (block 1330). For example, the second UE (e.g., using communication manager 140 and/or reception component 1502, depicted in FIG. 15) may receive, from the first UE and based at least in part on the sidelink transmission, a HARQ-ACK feedback based at least in part on the PSFCH resource comprising more than two symbols, as described above.

Process 1300 may include additional aspects, such as any single aspect or any combination of aspects described below and/or in connection with one or more other processes described elsewhere herein.

In a first aspect, process 1300 includes determining a PRB of the PSFCH resource comprising more than two symbols based at least in part on a function of a source identifier, a destination identifier, a quantity of PRBs in a frequency domain and a quantity of symbols in a time domain, wherein the HARQ-ACK feedback is received using the PRB, and the quantity of symbols in the time domain excludes an AGC symbol.

In a second aspect, alone or in combination with the first aspect, process 1300 includes determining a plurality of PRBs of the PSFCH resource comprising more than two symbols based at least in part on a mini-slot index, wherein the mini-slot index is used to assign the plurality of PRBs on different symbols of different mini-slots.

In a third aspect, alone or in combination with one or more of the first and second aspects, process 1300 includes transmitting, to the first UE, an indication associated with a scheduling of the HARQ-ACK feedback, wherein the indication indicates a time and a frequency associated with one or more PRBs of the PSFCH resource comprising more than two symbols, and the HARQ-ACK feedback is received based at least in part on the indication.

In a fourth aspect, alone or in combination with one or more of the first through third aspects, process 1300 includes transmitting, to the first UE, an indication of a per bit repetition factor for the resource pool, wherein the per bit repetition factor is based at least in part on a CSI measurement, or a priority or a QoS of the sidelink transmission.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
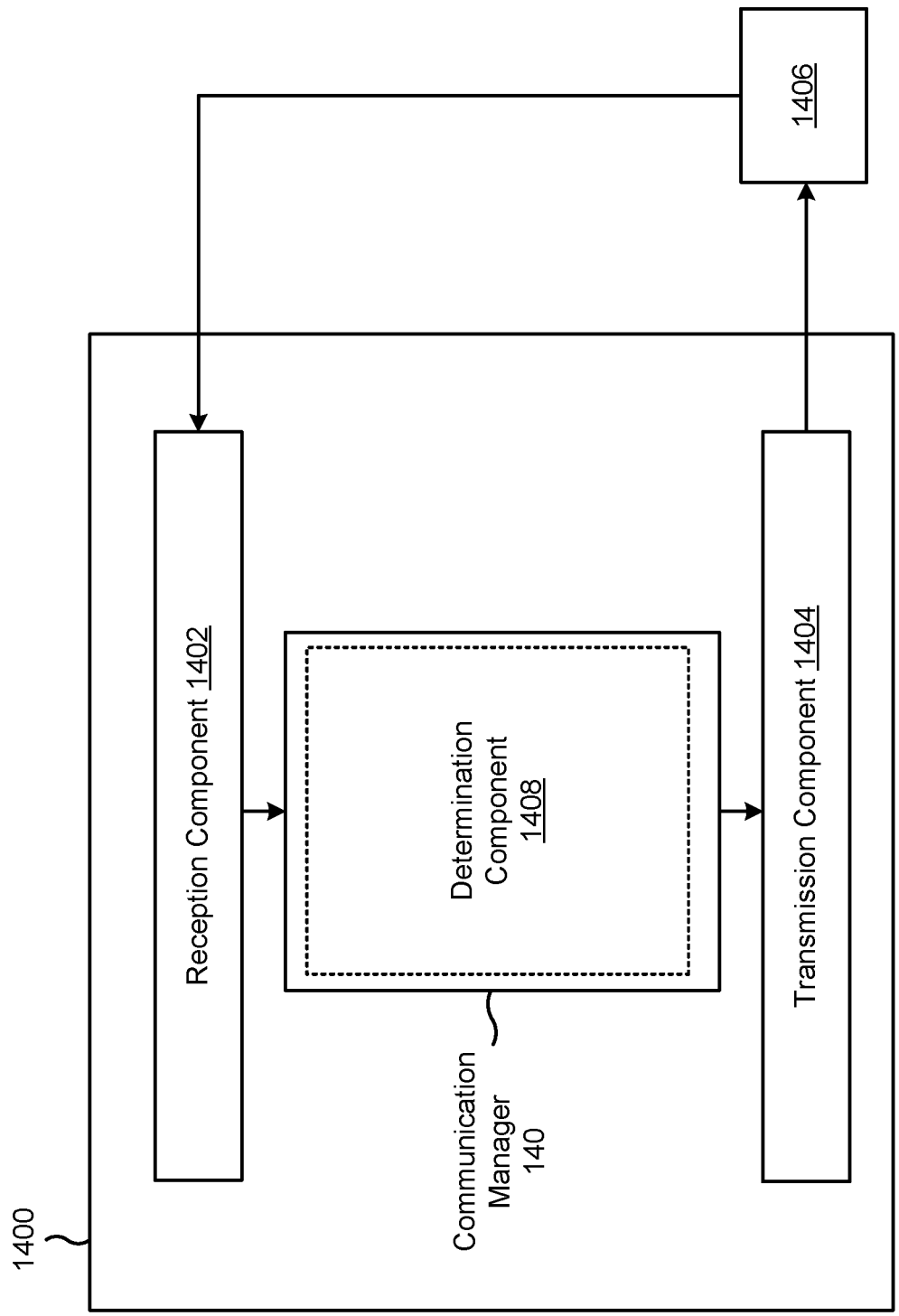
FIGS. 14-15 are diagrams of example apparatuses for wireless communication, in accordance with the present disclosure.

FIG. 14 is a diagram of an example apparatus 1400 for wireless communication, in accordance with the present disclosure. The apparatus 1400 may be a first UE, or a first UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a determination component 1408, among other examples.

In some aspects, the apparatus 1400 may be configured to perform one or more operations described herein in connection with FIGS. 8-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the first UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the first UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the first UE described in connection with FIG. 2. In some aspects, the transmission component 1404 may be co-located with the reception component 1402 in a transceiver.

The reception component 1402 may receive, from a second UE or a network node, a configuration for a resource pool, wherein the resource pool is associated with a PSFCH resource comprising more than two symbols. The reception component 1402 may receive, from the second UE, a sidelink transmission. The transmission component 1404 may transmit, to the second UE and based at least in part on the sidelink transmission, a HARQ-ACK feedback based at least in part on the PSFCH resource comprising more than two symbols.

The determination component 1408 may determine a PRB of the PSFCH resource comprising more than two symbols based at least in part on a function of a source identifier, a destination identifier, a quantity of PRBs in a frequency domain and a quantity of symbols in a time domain, wherein the HARQ-ACK feedback is transmitted using the PRB, and the quantity of symbols in the time domain excludes an AGC symbol. The determination component 1408 may determine a plurality of PRBs of the PSFCH resource comprising more than two symbols based at least in part on a mini-slot index, wherein the mini-slot index is used to assign the plurality of PRBs on different symbols of different mini-slots, and each PRB is used for a mini-slot HARQ-ACK feedback.

The reception component 1402 may receive, from one of the second UE or the network node, an indication associated with a scheduling of the HARQ-ACK feedback, wherein the indication indicates a time and a frequency associated with one or more PRBs of the PSFCH resource comprising more than two symbols, and the HARQ-ACK feedback is transmitted based at least in part on the indication. The reception component 1402 may receive, from the network node, a configuration for a per bit repetition factor for the resource pool, wherein the per bit repetition factor is based at least in part on a priority or a QoS of the sidelink transmission. The reception component 1402 may receive, from the second UE, an indication of a per bit repetition factor for the resource pool, wherein the per bit repetition factor is based at least in part on a CSI measurement, or a priority or a QoS of the sidelink transmission.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
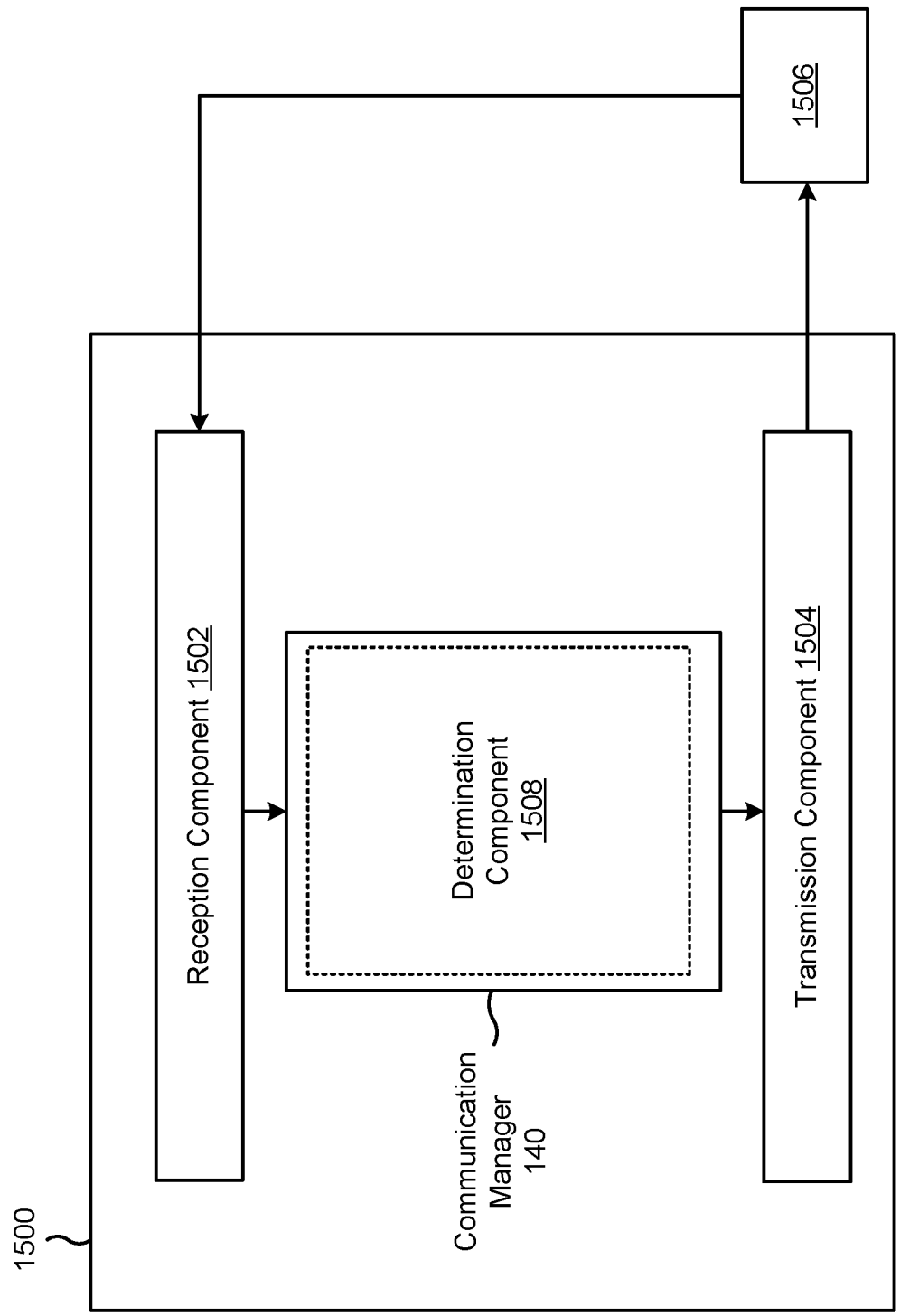

FIG. 15 is a diagram of an example apparatus 1500 for wireless communication, in accordance with the present disclosure. The apparatus 1500 may be a second UE, or a second UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a determination component 1508, among other examples.

In some aspects, the apparatus 1500 may be configured to perform one or more operations described herein in connection with FIGS. 8-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the second UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the second UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the second UE described in connection with FIG. 2. In some aspects, the transmission component 1504 may be co-located with the reception component 1502 in a transceiver.

The transmission component 1504 may transmit, to a first UE, a configuration for a resource pool, wherein the resource pool is associated with a PSFCH resource comprising more than two symbols. The transmission component 1504 may transmit, to the first UE, a sidelink transmission. The reception component 1502 may receive, from the first UE and based at least in part on the sidelink transmission, a HARQ-ACK feedback based at least in part on the PSFCH resource comprising more than two symbols.

The determination component 1508 may determine a PRB of the PSFCH resource comprising more than two symbols based at least in part on a function of a source identifier, a destination identifier, a quantity of PRBs in a frequency domain and a quantity of symbols in a time domain, wherein the HARQ-ACK feedback is received using the PRB, and the quantity of symbols in the time domain excludes an AGC symbol. The determination component 1508 may determine a plurality of PRBs of the PSFCH resource comprising more than two symbols based at least in part on a mini-slot index, wherein the mini-slot index is used to assign the plurality of PRBs on different symbols of different mini-slots.

The transmission component 1504 may transmit, to the first UE, an indication associated with a scheduling of the HARQ-ACK feedback, wherein the indication indicates a time and a frequency associated with one or more PRBs of the PSFCH resource comprising more than two symbols, and the HARQ-ACK feedback is received based at least in part on the indication. The transmission component 1504 may transmit, to the first UE, an indication of a per bit repetition factor for the resource pool, wherein the per bit repetition factor is based at least in part on a CSI measurement, or a priority or a QoS of the sidelink transmission.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a first user equipment (UE), comprising: receiving, from a second UE or a network node, a configuration for a resource pool, wherein the resource pool is associated with a physical sidelink feedback channel (PSFCH) resource comprising more than two symbols; receiving, from the second UE, a sidelink transmission; and transmitting, to the second UE and based at least in part on the sidelink transmission, a hybrid automatic repeat request (HARQ) acknowledgement (ACK) feedback based at least in part on the PSFCH resource comprising more than two symbols.

Aspect 2: The method of Aspect 1, wherein a first portion of the PSFCH resource comprising more than two symbols is used for an automatic gain control training, and wherein a second portion of the PSFCH resource comprising more than two symbols is used for transmitting the HARQ-ACK feedback.

Aspect 3: The method of any of Aspects 1 through 2, further comprising: determining a physical resource block (PRB) of the PSFCH resource comprising more than two symbols based at least in part on a function of a source identifier, a destination identifier, a quantity of PRBs in a frequency domain and a quantity of symbols in a time domain, wherein the HARQ-ACK feedback is transmitted using the PRB, and wherein the quantity of symbols in the time domain excludes an automatic gain control symbol.

Aspect 4: The method of any of Aspects 1 through 3, further comprising: determining a plurality of physical resource blocks (PRBs) of the PSFCH resource comprising more than two symbols based at least in part on a mini-slot index, wherein the mini-slot index is used to assign the plurality of PRBs on different symbols of different mini-slots, and wherein each PRB is used for a mini-slot HARQ-ACK feedback.

Aspect 5: The method of Aspect 4, wherein a quantity of the different symbols is equal to a quantity of the different mini-slots.

Aspect 6: The method of Aspect 4, wherein a quantity of the different symbols is less than a quantity of the different mini-slots, and two or more PRBs are assigned per symbol.

Aspect 7: The method of any of Aspects 1 through 6, further comprising: receiving, from one of the second UE or the network node, an indication associated with a scheduling of the HARQ-ACK feedback, wherein the indication indicates a time and a frequency associated with one or more physical resource blocks of the PSFCH resource comprising more than two symbols, and wherein the HARQ-ACK feedback is transmitted based at least in part on the indication.

Aspect 8: The method of any of Aspects 1 through 7, further comprising: receiving, from the network node, a configuration for a per bit repetition factor for the resource pool, wherein the per bit repetition factor is based at least in part on a priority or a quality of service of the sidelink transmission.

Aspect 9: The method of any of Aspects 1 through 8, further comprising: receiving, from the second UE, an indication of a per bit repetition factor for the resource pool, wherein the per bit repetition factor is based at least in part on a channel state information measurement, or a priority or a quality of service of the sidelink transmission.

Aspect 10: The method of any of Aspects 1 through 9, wherein the first UE is a receive UE that receives the sidelink transmission, wherein the second UE is a transmit UE that transmits the sidelink transmission, and wherein the second UE is a primary UE that controls a plurality of UEs including the first UE.

Aspect 11: A method of wireless communication performed by a second user equipment (UE), comprising: transmitting, to a first UE, a configuration for a resource pool, wherein the resource pool is associated with a physical sidelink feedback channel (PSFCH) resource comprising more than two symbols; transmitting, to the first UE, a sidelink transmission; and receiving, from the first UE and based at least in part on the sidelink transmission, a hybrid automatic repeat request (HARQ) acknowledgement (ACK) feedback based at least in part on the PSFCH resource comprising more than two symbols.

Aspect 12: The method of Aspect 11, further comprising: determining a physical resource block (PRB) of the PSFCH resource comprising more than two symbols based at least in part on a function of a source identifier, a destination identifier, a quantity of PRBs in a frequency domain and a quantity of symbols in a time domain, wherein the HARQ-ACK feedback is received using the PRB, and wherein the quantity of symbols in the time domain excludes an automatic gain control symbol.

Aspect 13: The method of any of Aspects 11 through 12, further comprising: determining a plurality of physical resource blocks (PRBs) of the PSFCH resource comprising more than two symbols based at least in part on a mini-slot index, wherein the mini-slot index is used to assign the plurality of PRBs on different symbols of different mini-slots.

Aspect 14: The method of any of Aspects 11 through 13, further comprising: transmitting, to the first UE, an indication associated with a scheduling of the HARQ-ACK feedback, wherein the indication indicates a time and a frequency associated with one or more physical resource blocks of the PSFCH resource comprising more than two symbols, and wherein the HARQ-ACK feedback is received based at least in part on the indication.

Aspect 15: The method of any of Aspects 11 through 14, further comprising: transmitting, to the first UE, an indication of a per bit repetition factor for the resource pool, wherein the per bit repetition factor is based at least in part on a channel state information measurement, or a priority or a quality of service of the sidelink transmission.

Aspect 16: An apparatus for wireless communication at a device, comprising a processor; memory coupled with the processor; and instructions stored in the memory and executable by the processor to cause the apparatus to perform the method of one or more of Aspects 1-10.

Aspect 17: A device for wireless communication, comprising a memory and one or more processors coupled to the memory, the one or more processors configured to perform the method of one or more of Aspects 1-10.

Aspect 18: An apparatus for wireless communication, comprising at least one means for performing the method of one or more of Aspects 1-10.

Aspect 19: A non-transitory computer-readable medium storing code for wireless communication, the code comprising instructions executable by a processor to perform the method of one or more of Aspects 1-10.

Aspect 20: A non-transitory computer-readable medium storing a set of instructions for wireless communication, the set of instructions comprising one or more instructions that, when executed by one or more processors of a device, cause the device to perform the method of one or more of Aspects 1-10.

Aspect 21: An apparatus for wireless communication at a device, comprising a processor; memory coupled with the processor; and instructions stored in the memory and executable by the processor to cause the apparatus to perform the method of one or more of Aspects 11-15.

Aspect 22: A device for wireless communication, comprising a memory and one or more processors coupled to the memory, the one or more processors configured to perform the method of one or more of Aspects 11-15.

Aspect 23: An apparatus for wireless communication, comprising at least one means for performing the method of one or more of Aspects 11-15.

Aspect 24: A non-transitory computer-readable medium storing code for wireless communication, the code comprising instructions executable by a processor to perform the method of one or more of Aspects 11-15.

Aspect 25: A non-transitory computer-readable medium storing a set of instructions for wireless communication, the set of instructions comprising one or more instructions that, when executed by one or more processors of a device, cause the device to perform the method of one or more of Aspects 11-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, the one or more memories storing code executable by the one or more processors to cause the first UE to:
   receive, from a second UE or a network node, a configuration for a resource pool, wherein the resource pool is associated with a physical sidelink feedback channel (PSFCH) resource comprising a first symbol for an automatic gain control training and two or more additional symbols for hybrid automatic repeat request (HARQ) acknowledgement (ACK) feedback;
   receive, from the second UE, a sidelink transmission; and
   transmit, to the second UE and based at least in part on the sidelink transmission, the HARQ ACK feedback based at least in part on the two or more additional symbols of the PSFCH resource.

2. The apparatus of claim 1, wherein the one or more memories further stores code executable by the one or more processors to cause the first UE to:
   determine a physical resource block (PRB) of the PSFCH resource based at least in part on a function of a source identifier, a destination identifier, a quantity of PRBs in a frequency domain, and a quantity of symbols in a time domain, wherein the HARQ-ACK feedback is transmitted using the PRB, and wherein the quantity of symbols in the time domain excludes the first symbol.

3. The apparatus of claim 1, wherein the one or more memories further stores code executable by the one or more processors to cause the first UE to:
   determine a plurality of physical resource blocks (PRBs) of the PSFCH resource comprising based at least in part on a mini-slot index, wherein the mini-slot index is used to assign the plurality of PRBs on different symbols of different mini-slots, and wherein each PRB is used for a mini-slot HARQ-ACK feedback.

4. The apparatus of claim 3, wherein a quantity of the different symbols is equal to a quantity of the different mini-slots.

5. The apparatus of claim 3, wherein a quantity of the different symbols is less than a quantity of the different mini-slots, and two or more PRBs are assigned per symbol.

6. The apparatus of claim 1, wherein the one or more memories further stores code executable by the one or more processors to cause the first UE to:
   receive, from one of the second UE or the network node, an indication associated with a scheduling of the HARQ-ACK feedback, wherein the indication indicates a time and a frequency associated with one or more physical resource blocks of the PSFCH resource, and wherein the HARQ-ACK feedback is transmitted based at least in part on the indication.

7. The apparatus of claim 1, wherein the one or more memories further stores code executable by the one or more processors to cause the first UE to:
   receive, from the network node, a configuration for a per bit repetition factor for the resource pool, wherein the per bit repetition factor is based at least in part on a priority or a quality of service of the sidelink transmission.

8. The apparatus of claim 1, wherein the one or more memories further stores code executable by the one or more processors to cause the first UE to:
   receive, from the second UE, an indication of a per bit repetition factor for the resource pool, wherein the per bit repetition factor is based at least in part on a channel state information measurement, or a priority or a quality of service of the sidelink transmission.

9. The apparatus of claim 1, wherein the first UE is a receive UE that receives the sidelink transmission, wherein the second UE is a transmit UE that transmits the sidelink transmission, and wherein the second UE is a primary UE that controls a plurality of UEs including the first UE.

10. The apparatus of claim 1, wherein the configuration is received from the network node.

11. The apparatus of claim 6, wherein the indication is received from the network node.

12. An apparatus for wireless communication at a second user equipment (UE), comprising:
    one or more memories; and
    one or more processors, coupled to the one or more memories, the one or more memories storing code executable by the one or more processors to cause the second UE to:
    transmit, to a first UE, a configuration for a resource pool, wherein the resource pool is associated with a physical sidelink feedback channel (PSFCH) resource comprising a first symbol for an automatic gain control training and two or more additional symbols for hybrid automatic repeat request (HARQ) acknowledgement (ACK) feedback;

transmit, to the first UE, a sidelink transmission; and
receive, from the first UE and based at least in part on
the sidelink transmission, the HARQ ACK feedback
based at least in part on two or more additional
symbols of the PSFCH resource.

13. The apparatus of claim 12, wherein the one or more memories further stores code executable by the one or more processors to cause the second UE to:
determine a physical resource block (PRB) of the PSFCH resource based at least in part on a function of a source identifier, a destination identifier, a quantity of PRBs in a frequency domain and a quantity of symbols in a time domain, wherein the HARQ-ACK feedback is received using the PRB, and wherein the quantity of symbols in the time domain excludes the first symbol.

14. The apparatus of claim 12, wherein the one or more memories further stores code executable by the one or more processors to cause the second UE to:
determine a plurality of physical resource blocks (PRBs) of the PSFCH resource based at least in part on a mini-slot index, wherein the mini-slot index is used to assign the plurality of PRBs on different symbols of different mini-slots.

15. The apparatus of claim 12, wherein the one or more memories further stores code executable by the one or more processors to cause the second UE to:
transmit, to the first UE, an indication associated with a scheduling of the HARQ-ACK feedback, wherein the indication indicates a time and a frequency associated with one or more physical resource blocks of the PSFCH resource, and wherein the HARQ-ACK feedback is received based at least in part on the indication.

16. The apparatus of claim 12, wherein the one or more memories further stores code executable by the one or more processors to cause the second UE to:
transmit, to the first UE, an indication of a per bit repetition factor for the resource pool, wherein the per bit repetition factor is based at least in part on a channel state information measurement, or a priority or a quality of service of the sidelink transmission.

17. A method of wireless communication performed by a first user equipment (UE), comprising:
receiving, from a second UE or a network node, a configuration for a resource pool, wherein the resource pool is associated with a physical sidelink feedback channel (PSFCH) resource comprising a first symbol for an automatic gain control training and two or more additional symbols for hybrid automatic repeat request (HARQ) acknowledgement (ACK) feedback;
receiving, from the second UE, a sidelink transmission; and
transmitting, to the second UE and based at least in part on the sidelink transmission, HARQ ACK feedback based at least in part on the two or more additional symbols of the PSFCH resource.

18. The method of claim 17, further comprising:
determining a physical resource block (PRB) of the PSFCH resource based at least in part on a function of a source identifier, a destination identifier, a quantity of PRBs in a frequency domain and a quantity of symbols in a time domain, wherein the HARQ-ACK feedback is transmitted using the PRB, and wherein the quantity of symbols in the time domain excludes the first symbol.

19. The method of claim 17, further comprising:
determining a plurality of physical resource blocks (PRBs) of the PSFCH resource based at least in part on a mini-slot index, wherein the mini-slot index is used to assign the plurality of PRBs on different symbols of different mini-slots, and wherein each PRB is used for a mini-slot HARQ-ACK feedback.

20. The method of claim 19, wherein a quantity of the different symbols is equal to a quantity of the different mini-slots.

21. The method of claim 19, wherein a quantity of the different symbols is less than a quantity of the different mini-slots, and two or more PRBs are assigned per symbol.

22. The method of claim 17, further comprising:
receiving, from one of the second UE or the network node, an indication associated with a scheduling of the HARQ-ACK feedback, wherein the indication indicates a time and a frequency associated with one or more physical resource blocks of the PSFCH resource, and wherein the HARQ-ACK feedback is transmitted based at least in part on the indication.

23. The method of claim 17, further comprising:
receiving, from the network node, a configuration for a per bit repetition factor for the resource pool, wherein the per bit repetition factor is based at least in part on a priority or a quality of service of the sidelink transmission.

24. The method of claim 16, further comprising:
receiving, from the second UE, an indication of a per bit repetition factor for the resource pool, wherein the per bit repetition factor is based at least in part on a channel state information measurement, or a priority or a quality of service of the sidelink transmission.

25. The method of claim 17, wherein the first UE is a receive UE that receives the sidelink transmission, wherein the second UE is a transmit UE that transmits the sidelink transmission, and wherein the second UE is a primary UE that controls a plurality of UEs including the first UE.

26. A method of wireless communication performed by a second user equipment (UE), comprising:
transmitting, to a first UE, a configuration for a resource pool, wherein the resource pool is associated with a physical sidelink feedback channel (PSFCH) resource comprising a first symbol for an automatic gain control training and two or more additional symbols for hybrid automatic repeat request (HARQ) acknowledgement (ACK) feedback;
transmitting, to the first UE, a sidelink transmission; and
receiving, from the first UE and based at least in part on the sidelink transmission, the HARQ ACK feedback based at least in part on the two or more additional symbols of the PSFCH resource.

27. The method of claim 26, further comprising:
determining a physical resource block (PRB) of the PSFCH resource based at least in part on a function of a source identifier, a destination identifier, a quantity of PRBs in a frequency domain and a quantity of symbols in a time domain, wherein the HARQ-ACK feedback is received using the PRB, and wherein the quantity of symbols in the time domain excludes first symbol.

28. The method of claim 26, further comprising:
determining a plurality of physical resource blocks (PRBs) of the PSFCH resource based at least in part on a mini-slot index, wherein the mini-slot index is used to assign the plurality of PRBs on different symbols of different mini-slots.

29. The method of claim 26, further comprising:
transmitting, to the first UE, an indication associated with a scheduling of the HARQ-ACK feedback, wherein the indication indicates a time and a frequency associated with one or more physical resource blocks of the PSFCH resource, and wherein the HARQ-ACK feedback is received based at least in part on the indication.

30. The method of claim 26, further comprising:
transmitting, to the first UE, an indication of a per bit repetition factor for the resource pool, wherein the per bit repetition factor is based at least in part on a channel state information measurement, or a priority or a quality of service of the sidelink transmission.

* * * * *